US011939177B2

(12) United States Patent
Nishihara et al.

(10) Patent No.: US 11,939,177 B2
(45) Date of Patent: Mar. 26, 2024

(54) IMAGE FORMING APPARATUS

(71) Applicant: CANON KABUSHIKI KAISHA, Tokyo (JP)

(72) Inventors: Hiroto Nishihara, Ibaraki (JP); Yohei Katto, Chiba (JP); Yutaka Ando, Ibaraki (JP); Teruhito Kai, Chiba (JP); Akihiro Kawakita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 16/953,455

(22) Filed: Nov. 20, 2020

(65) Prior Publication Data

US 2021/0163242 A1 Jun. 3, 2021

(30) Foreign Application Priority Data

Dec. 2, 2019 (JP) ................................ 2019-218302

(51) Int. Cl.
*B65H 1/18* (2006.01)
*B65H 1/04* (2006.01)
(Continued)

(52) U.S. Cl.
CPC ................ *B65H 1/18* (2013.01); *B65H 1/04* (2013.01); *B65H 2301/4434* (2013.01); *B65H 2551/20* (2013.01); *G03G 15/6502* (2013.01)

(58) Field of Classification Search
CPC . B65H 1/18; B65H 1/14; B65H 1/266; B65H 2551/20
See application file for complete search history.

(56) References Cited

U.S. PATENT DOCUMENTS 4,801,135 A * 1/1989 Povio ...................... B65H 1/18 271/157
5,214,480 A 5/1993 Aoki et al.
(Continued)

FOREIGN PATENT DOCUMENTS

JP S64-048729 A 2/1989
JP 01176733 A * 7/1989
(Continued)

OTHER PUBLICATIONS

Computer translation of Japanese Patent Application Pub. No. 2019-123615 A.
(Continued)

*Primary Examiner* — Luis A Gonzalez
(74) *Attorney, Agent, or Firm* — Venable LLP

(57) ABSTRACT

An image forming apparatus includes a sheet accommodating portion, an image forming portion, an accommodating portion opening portion, a lifter plate, a lifter plate lifting and lowering mechanism, a lower-limit detecting portion, a control unit lowering the lifter plate and opening the accommodating portion in accordance with an operation in a set mode of a plurality of modes when the control unit receives an instruction to open the accommodating portion, wherein the modes includes a first mode in which the accommodating portion is opened irrespective of whether or not the lifter plate lowers to the lower-limit position and a second mode in which the accommodating portion is opened after the lifter plate lowers to the lower-limit position; and an operating portion operable by an operator for changing setting of the mode, between the modes, executed when the control unit receives the instruction to open the accommodating portion.

7 Claims, 11 Drawing Sheets

(a)

(b)

(51) Int. Cl.
*B65H 1/26* (2006.01)
*G03G 15/00* (2006.01)

(56) References Cited

U.S. PATENT DOCUMENTS

| | | | | |
|---|---|---|---|---|
| 6,651,980 | B2 | 11/2003 | Isemura et al. | |
| 6,782,236 | B2 | 8/2004 | Sasaki et al. | |
| 6,987,251 | B2 | 1/2006 | Fukushi et al. | |
| 7,030,345 | B2 | 4/2006 | Nishihara et al. | |
| 7,053,345 | B2 | 5/2006 | Fukushi et al. | |
| 7,722,032 | B2 * | 5/2010 | Sasaki | B65H 9/04 271/157 |
| 9,823,610 | B2 | 11/2017 | Kai et al. | |
| 9,871,934 | B2 | 1/2018 | Takahashi et al. | |
| 10,114,327 | B2 | 10/2018 | Miyake et al. | |
| 10,239,717 | B2 | 3/2019 | Kai et al. | |
| 10,308,458 | B2 | 6/2019 | Takahashi et al. | |
| 10,362,182 | B2 | 7/2019 | Yumoto et al. | |
| 10,384,895 | B2 | 8/2019 | Yokoya et al. | |
| 10,625,970 | B2 | 4/2020 | Yamamoto et al. | |
| 2005/0067759 | A1 | 3/2005 | Koga et al. | |
| 2018/0097947 | A1 | 4/2018 | Takahashi et al. | |
| 2018/0341210 | A1 | 11/2018 | Kawakita et al. | |
| 2018/0348689 | A1 | 12/2018 | Ando et al. | |
| 2019/0049892 | A1 | 2/2019 | Yokoya et al. | |
| 2019/0161300 | A1 | 5/2019 | Katto | |
| 2020/0095081 | A1 | 3/2020 | Kai et al. | |
| 2020/0189868 | A1 | 6/2020 | Yokoya et al. | |
| 2020/0307274 | A1 | 10/2020 | Yumoto et al. | |
| 2020/0310319 | A1 | 10/2020 | Fukuhara et al. | |
| 2020/0314253 | A1 | 10/2020 | Ando et al. | |
| 2020/0356038 | A1 | 11/2020 | Nishikata et al. | |

FOREIGN PATENT DOCUMENTS

| | | | |
|---|---|---|---|
| JP | H04-133910 | A | 5/1992 |
| JP | H05-116777 | A | 5/1993 |
| JP | H10-120204 | A | 5/1998 |
| JP | 2006-044809 | A | 2/2006 |
| JP | 2017-024895 | A | 2/2017 |
| JP | 2019123615 | A * | 7/2019 |

OTHER PUBLICATIONS

Oct. 17, 2023 Japanese Official Action in Japanese Patent Appln. No. 2019-218302.

* cited by examiner (a)

(b)

IMAGE FORMING APPARATUS

FIELD OF THE INVENTION AND RELATED ART

The present invention relates to an image forming apparatus for forming an image on a sheet fed from an accommodating portion for accommodating the sheet.

The image forming apparatus such as a printer, a copying machine or a multi-function machine is required to improve productivity of output of the image-formed sheet. As one of methods of maintaining high productivity, it is possible to cite a method in which by increasing a volume of the accommodating portion for accommodating sheets for image formation, a frequency of an occurrence of downtime for replenishing the sheets is suppressed. U.S. Patent Application Publication No. US2005/0067759 discloses that in the case where a large-volume accommodating portion of an image forming apparatus is pulled out, lifting and lowering of a lifter plate (lift plate) is controlled so that a top surface position of the sheets stacked on the lifter plate is maintained at a predetermined position between an upper-limit position and a lower-limit position of the lifter plate. According to U.S. Patent Application Publication NO. US2005/0067759, the top surface of the sheets is maintained at a proper height, so that supply and exchange of the sheets become easy.

However, a viewpoint of convenience varies depending on users in some instances. For example, some uses desire that sheets in a large amount close to an upper limit of a volume of the accommodating portion are supplied at one time in some instances. In such a case, advantage such that the lifting and lowering control of the lifter plate as disclosed in the above-described U.S. Patent Application Publication is poor.

SUMMARY OF THE INVENTION

According to an aspect of the present invention, there is provided an image forming apparatus comprising: an accommodating portion configured to accommodate a sheet; an image forming portion configured to form an image on the sheet fed from the accommodating portion; an opening portion configured to open the accommodating portion to an outside for supplying a sheet; a lifter plate which is provided in the accommodating portion and on which the sheet is stacked; a lifting and lowering mechanism configured to lift and lower the lifter plate; a lower-limit detecting portion configured to detect that the lifter plate is in a lower-limit position in the accommodating portion; a control unit configured to control the lifting and lowering mechanism and the opening portion so that lowering of the lifter plate and opening of the accommodating portion are carried out in accordance with an operation in a set mode of a plurality of modes when the control unit receives an instruction to open the accommodating portion, wherein the modes includes a first mode in which the accommodating portion is opened irrespective of whether or not the lifter plate lowers to the lower-limit position and a second mode in which the accommodating portion is opened after the lifter plate lowers to the lower-limit position; and an operating portion configured to be operated by an operator for changing setting of the mode, between the modes, executed when the control unit receives the instruction to open the accommodating portion.

Further features of the present invention will become apparent from the following description of exemplary embodiments with reference to the attached drawings.

Figure 2:
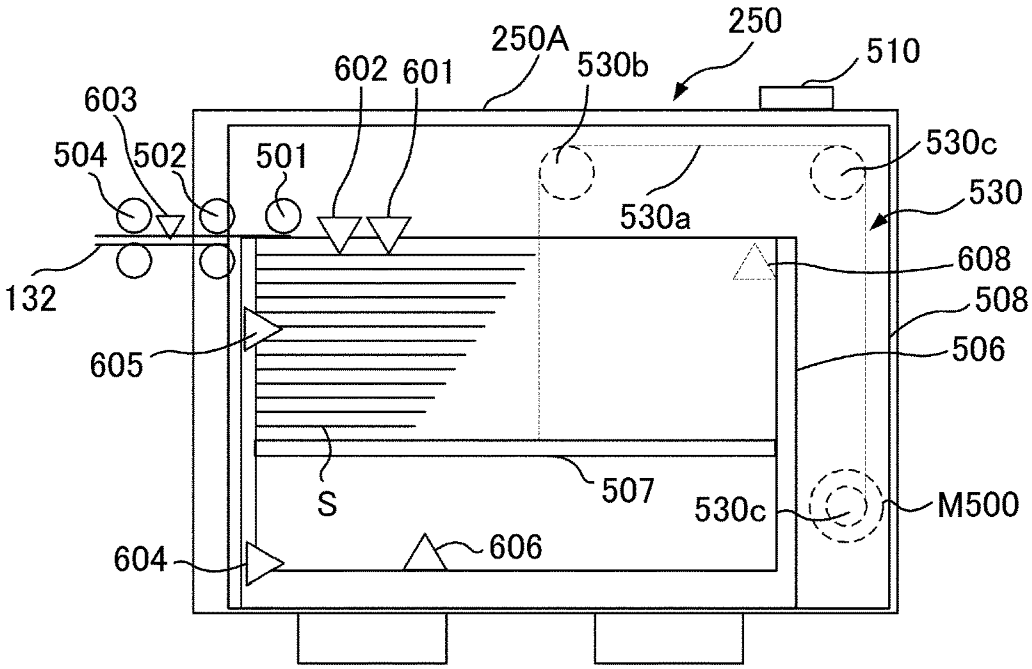
Figure 2:
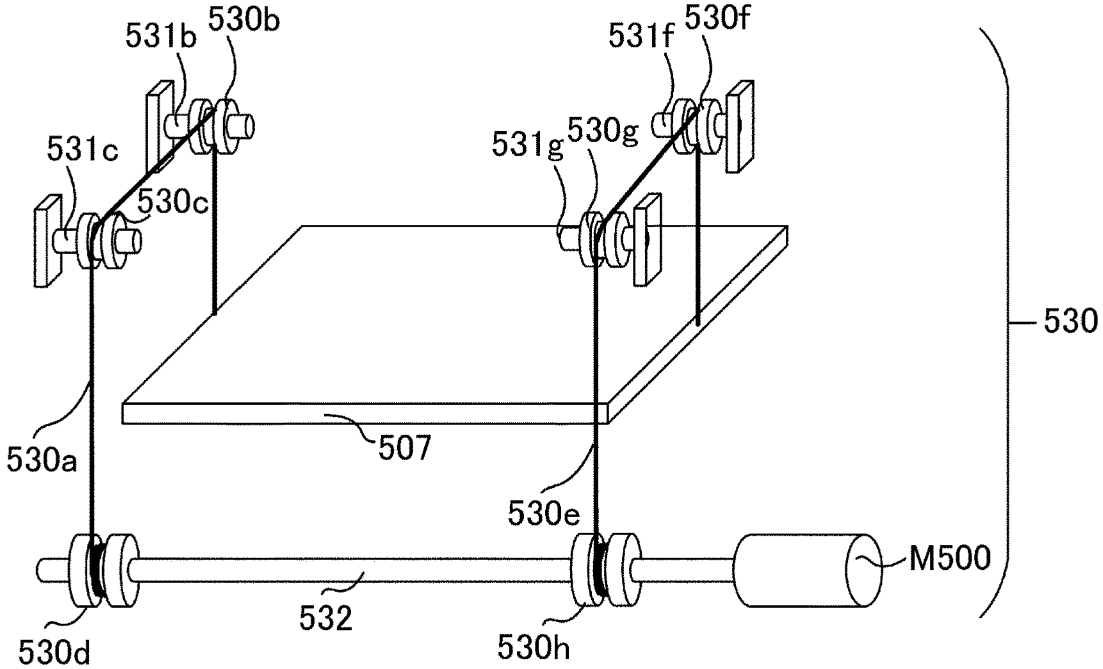

Part (a) of FIG. 2 is a schematic view of an option feeder in the embodiment 1, and part (b) of FIG. 2 is a schematic view of a lifting mechanism in the embodiment 1.

Figure 3:
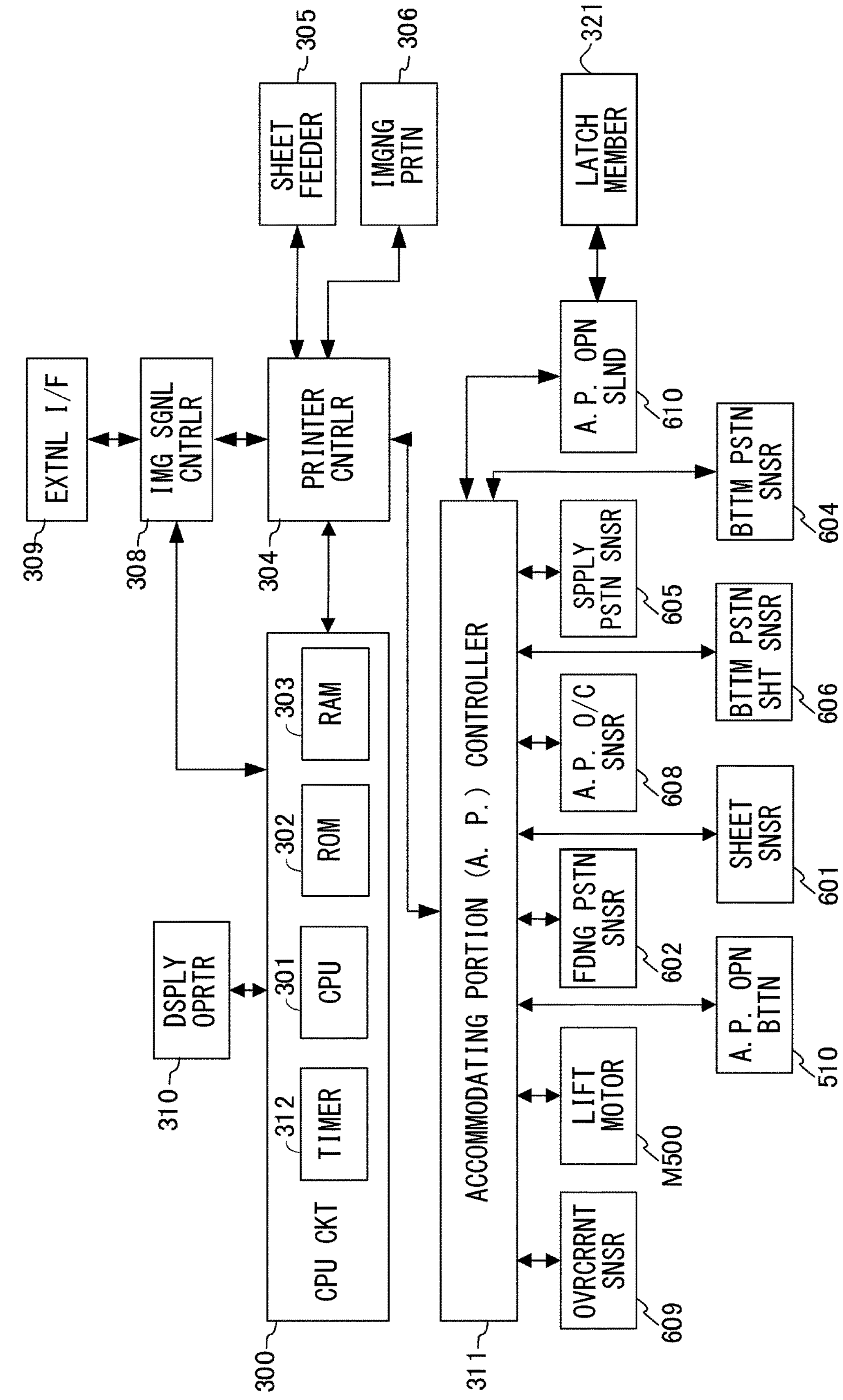

FIG. 3 is a block diagram showing a control constitution of the image forming apparatus according to the embodiment 1.

Figure 4:
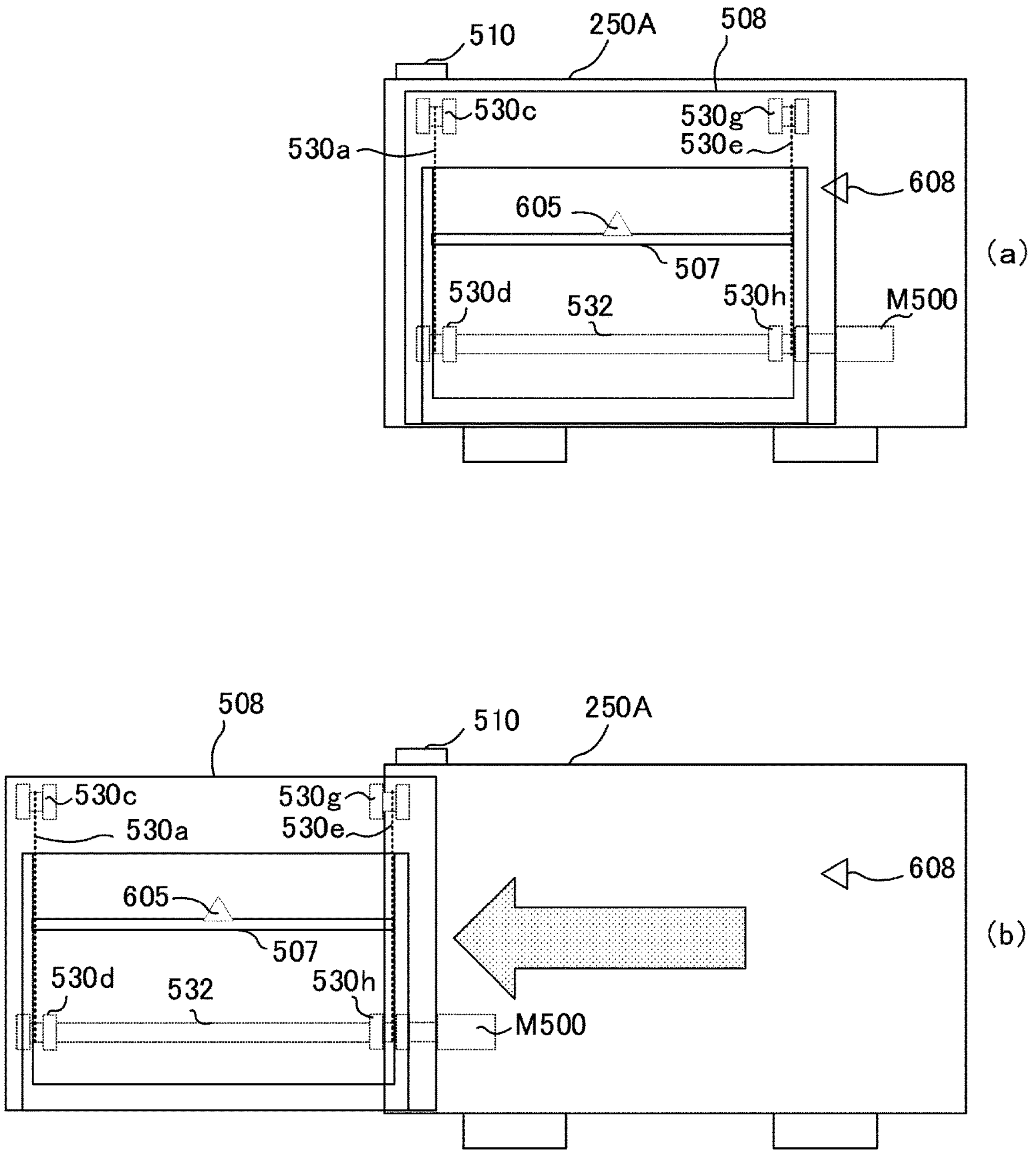

Parts (a) and (b) of FIG. 4 are schematic views for illustrating opening and closing of the option feeder in the embodiment 1.

Figure 5:
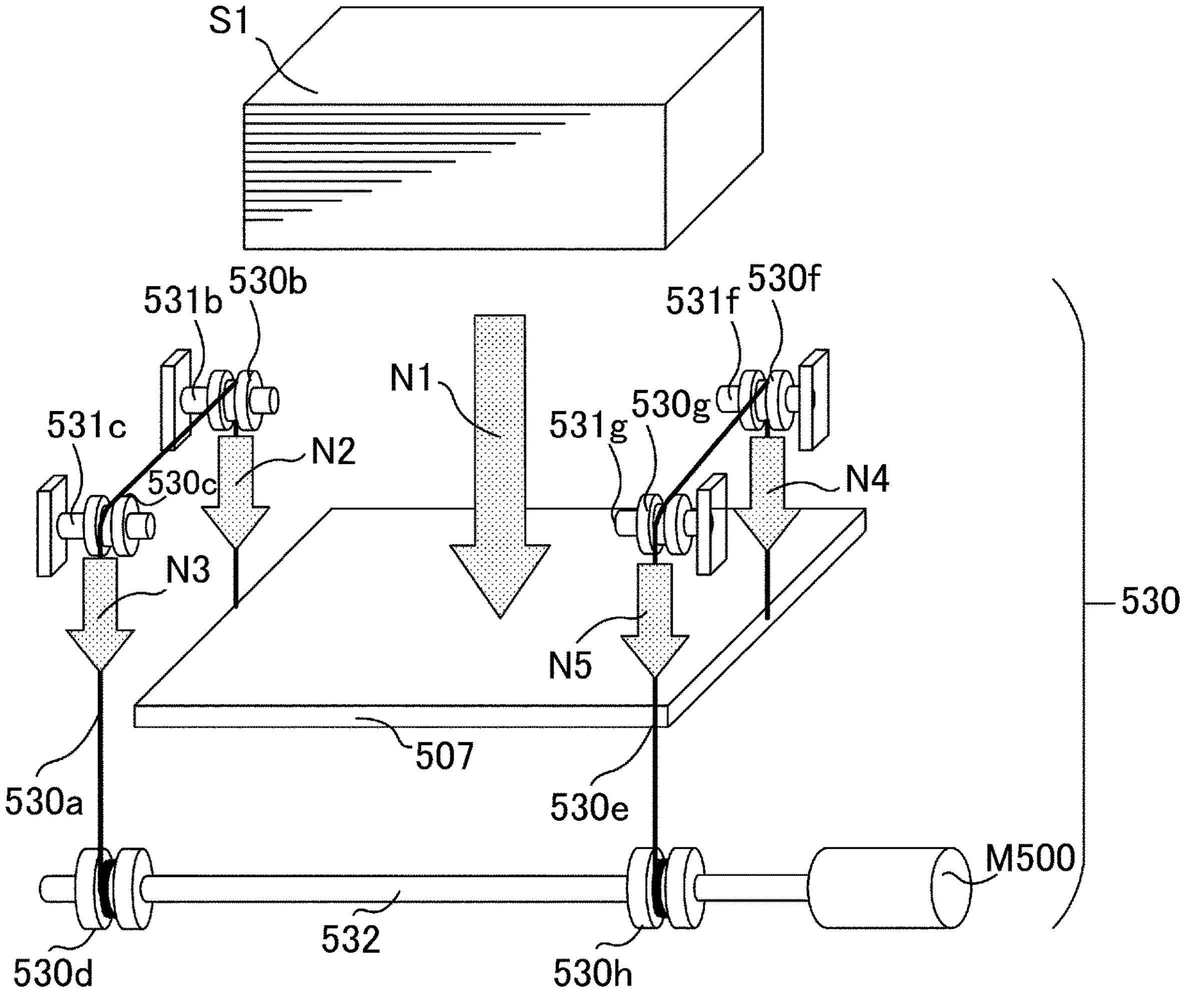

FIG. 5 is a conceptual view showing a load exerted on the lifting mechanism during sheet supply in the embodiment 1.

Figure 6:
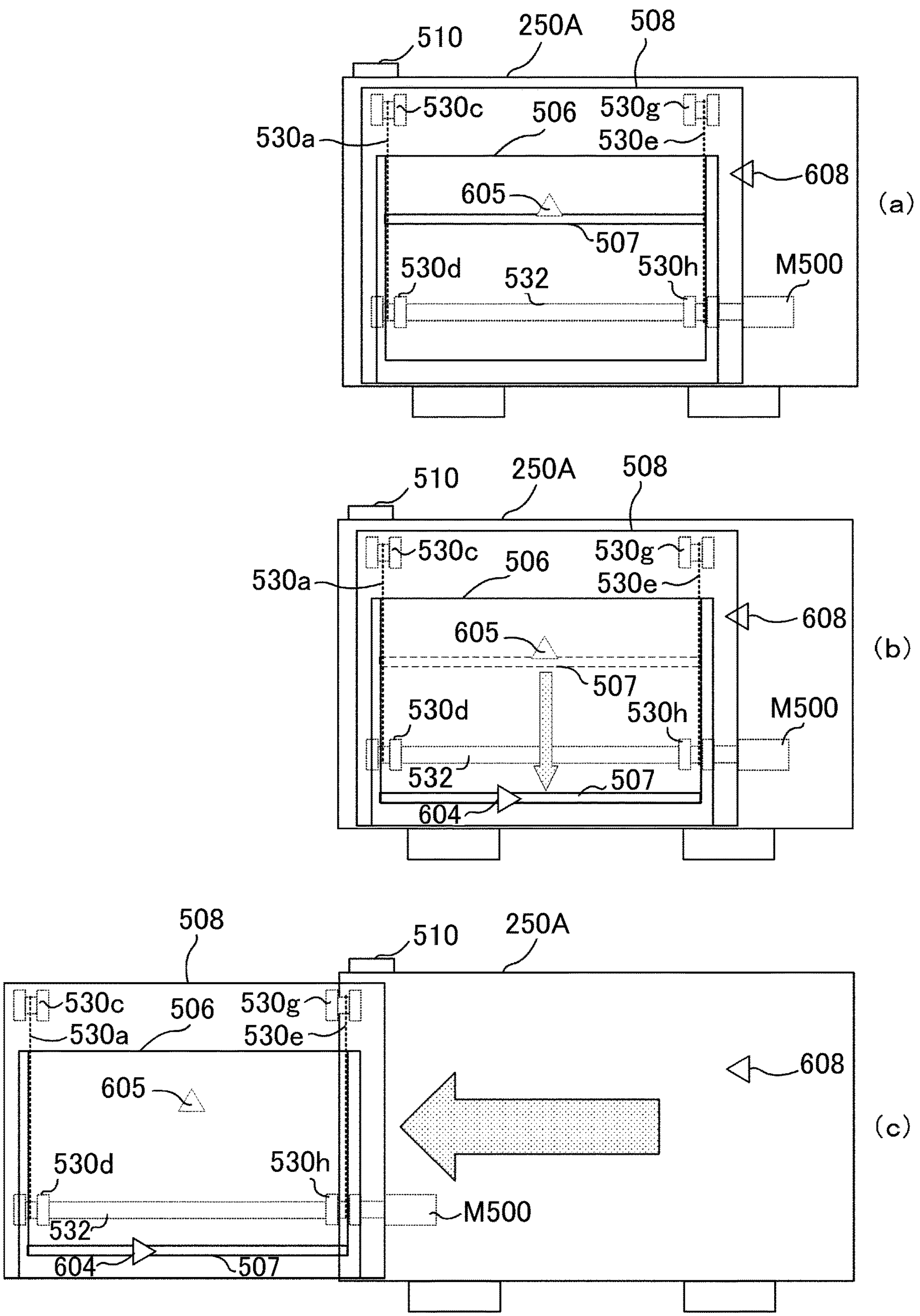

Parts (a), (b) and (c) of FIG. 6 are schematic views for illustrating an opening operation of the option feeder by open control after lifter lowering in the embodiment 1.

Figure 7:
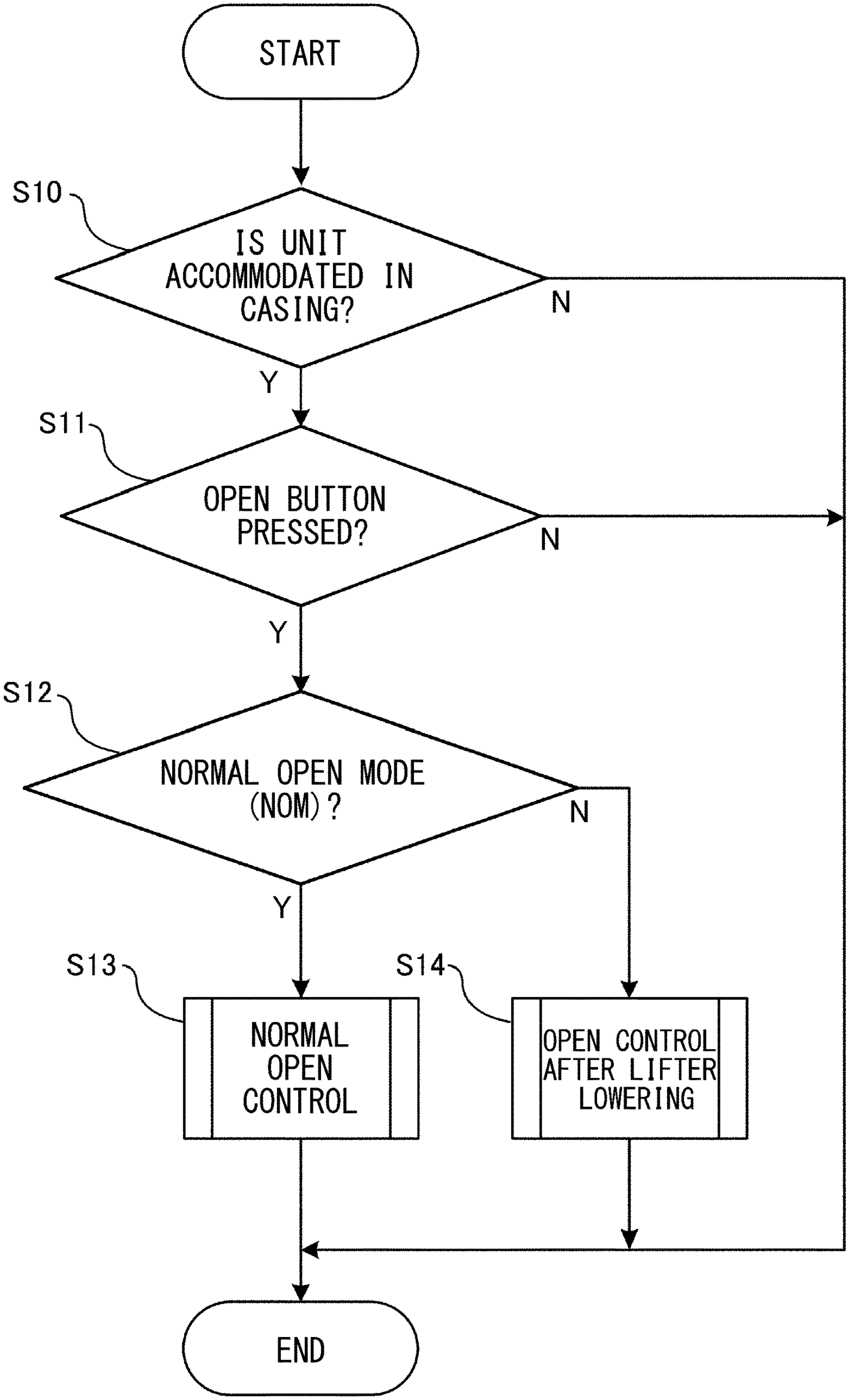

FIG. 7 is a flowchart showing a process when an accommodating portion open button is pressed in the embodiment 1.

Figure 8:
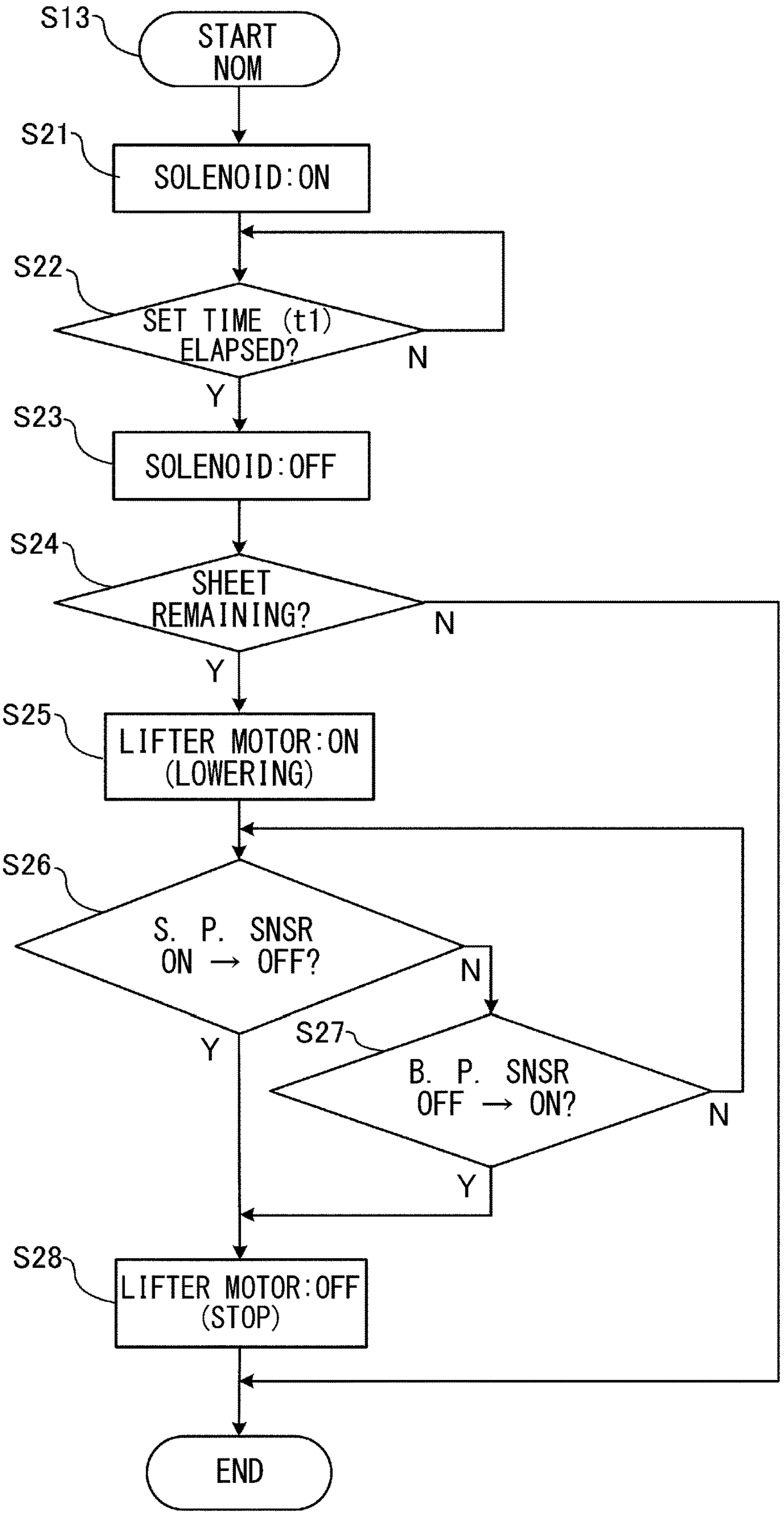

FIG. 8 is a flowchart showing a process of normal open control in the embodiment 1.

Figure 9:
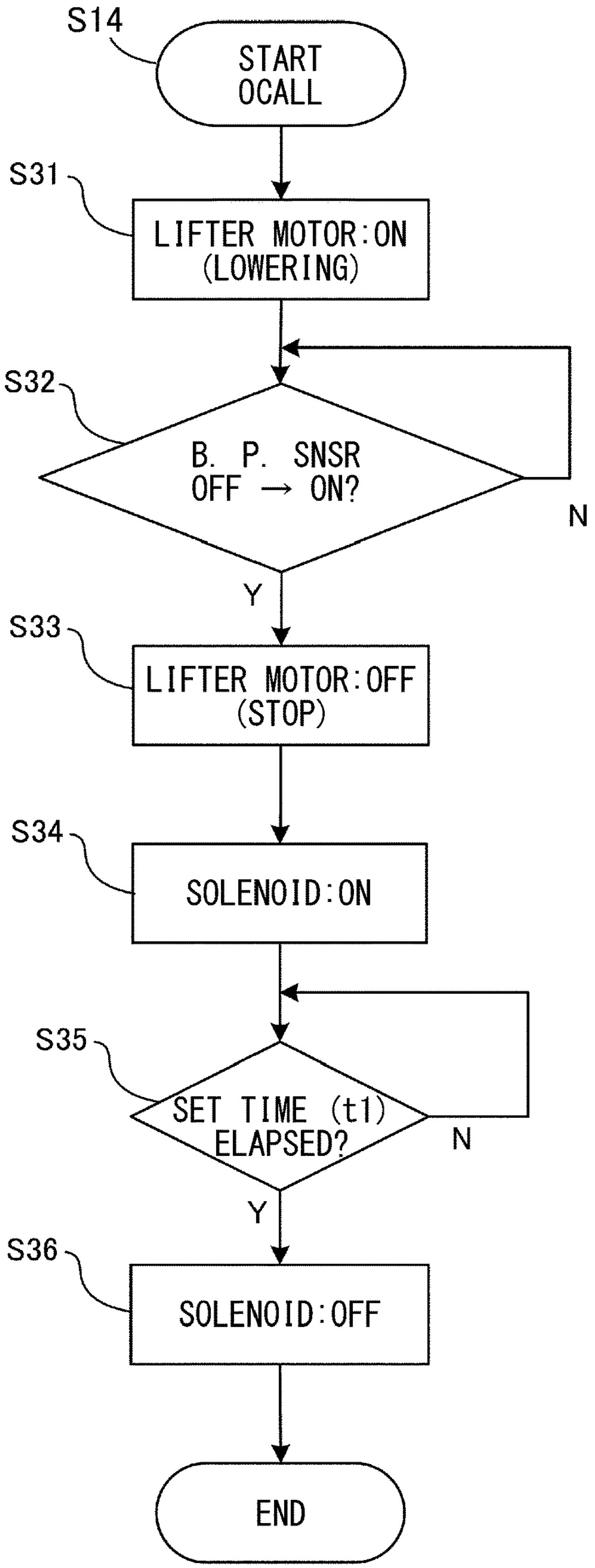

FIG. 9 is a flowchart showing a process of the open control after lifter lowering in the embodiment 1.

Figure 10:
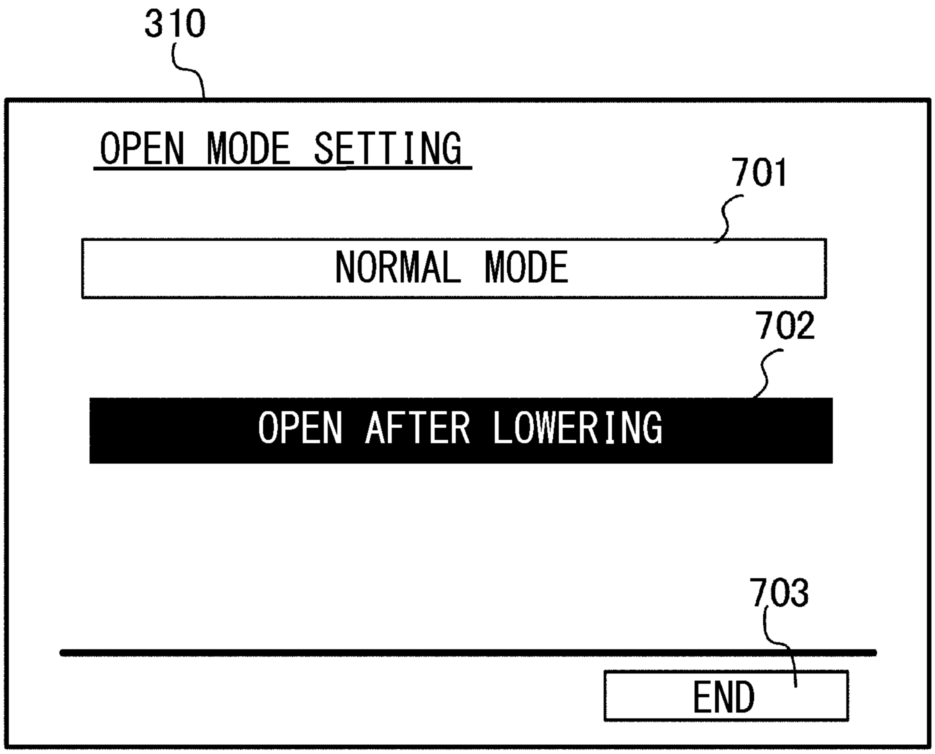

FIG. 10 is a schematic view showing a switching screen of an operation in an accommodating portion open mode in the embodiment 1.

Figure 11:
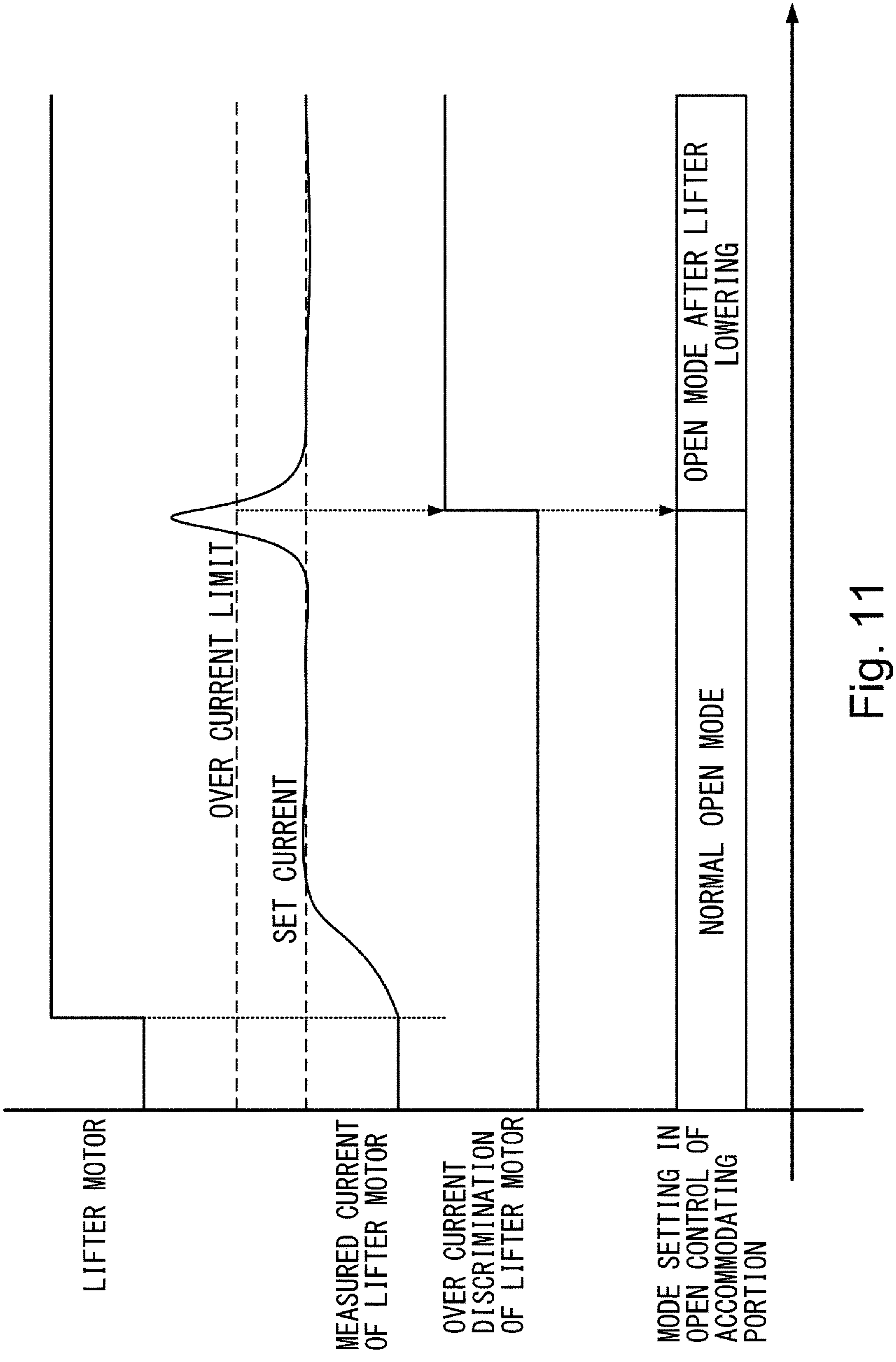

FIG. 11 is a chart showing a time series of automatic switching of an accommodating portion open mode in an embodiment 2.

DESCRIPTION OF THE EMBODIMENTS

In the following, an exemplary embodiment for carrying out the present invention will be described while making reference to the drawings.

Image Forming Apparatus

Figure 1:
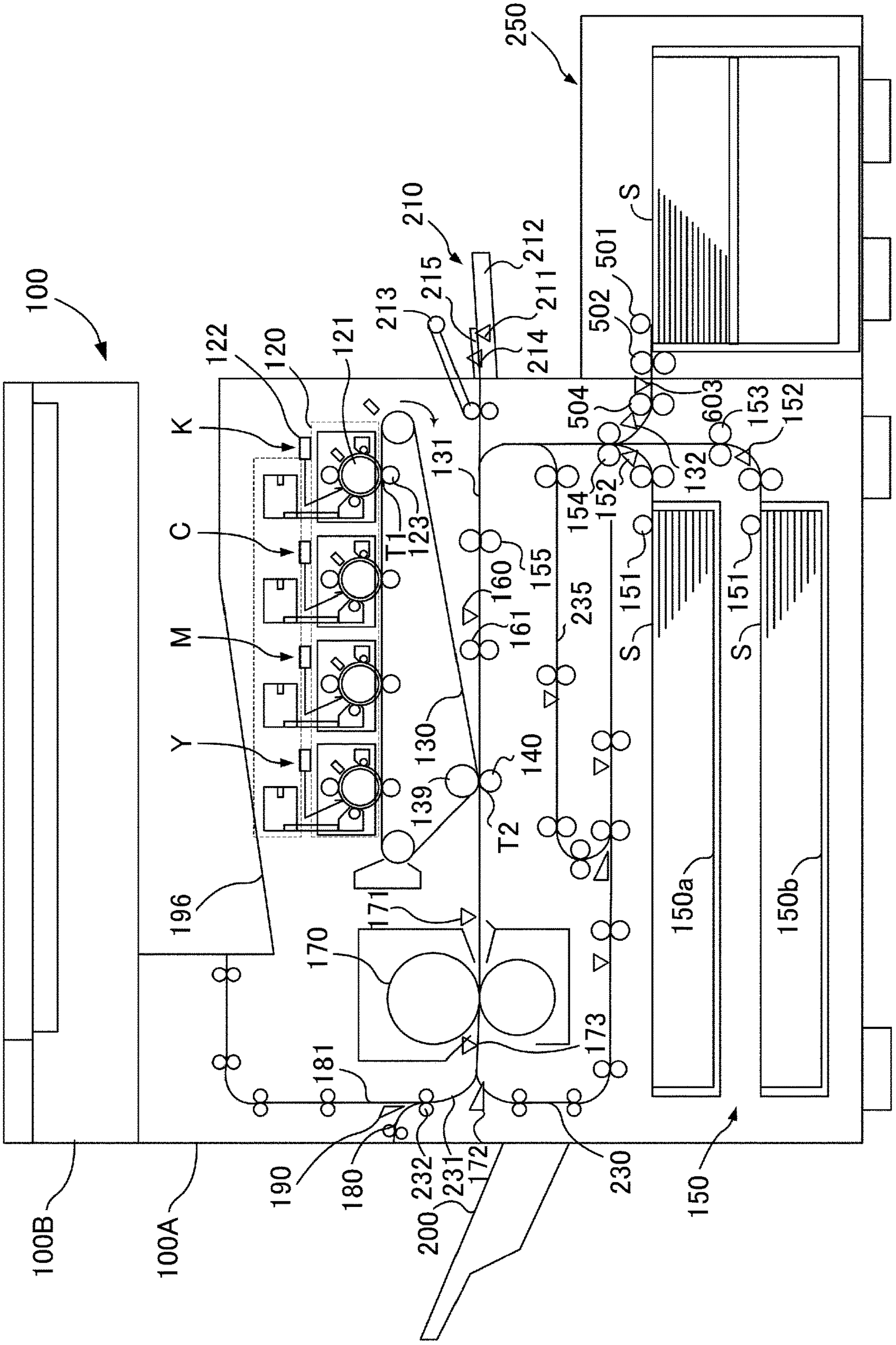
FIG. 1 is a schematic view of an image forming apparatus according to an embodiment 1.

FIG. 1 is a sectional view showing a general structure of an image forming apparatus 100. In FIG. 1, the image forming apparatus 100 includes a printer main assembly 100A which is a main assembly thereof and an image reading apparatus (image reader) 100B provided on the printer main assembly 100A. The image reader 100B reads, for example, an image of an original placed on a platen glass and sends read image data, as a video signal, to a scanner unit of the printer main assembly 100A. On the basis of image information inputted from an external PC or the image data read from the original, the printer main assembly 100A forms an image on a state used as a recording medium. The sheet used as the recording medium includes paper such as plain paper or thick paper, a plastic film such as a sheet for an overhead projector, a sheet with a special shape, such as an example or index paper, and a cloth.

The printer main assembly 100A includes a process unit 120 for forming a color image, a cassette feeding portion 150 and a normal feeding portion 210 which are used for feeding sheets S which are recording materials, and a sheet feeding system for feeding the sheets S.

The process unit 120 provided as an image forming means includes image forming stations Y, M, C and K juxtaposed along a horizontal direction. The image forming stations Y, M, C and K form toner images of yellow, magenta, cyan and black, respectively. The image forming stations Y, M, C and K have substantially the same constitution except for the colors of toners used in development. That is, each of the image forming stations Y to K is an electrophotographic unit including a photosensitive drum 121 which is a photosensitive member shaft-supported rotatably, and forms the toner image on a surface of the photosensitive drum 121 as an image bearing member. As regards each of the image forming stations Y to K, in order to execute steps of an electrophotographic process, a primary charging device, a developing device and a cleaning device are provided so as to oppose an outer peripheral surface of the photosensitive drum 121. Each of the developing devices is connected to a toner supplying portion for supplying the toner of an associated color.

Under the process unit 120, an endless intermediary transfer belt 130 is provided so as to contact the photosensitive drums 121 of the image forming stations Y to K. Further, four primary transfer rollers 123 are provided so as to oppose the four photosensitive drums 121 through the intermediary transfer belt 130, so that a primary transfer portion T1 is formed as a nip between each of the primary transfer rollers 123 and the associated one of the photosensitive drums 121.

The intermediary transfer belt 130 is an intermediary transfer member functioning as an image bearing member for bearing the toner image similarly as the photosensitive drum 121. The intermediary transfer belt 130 is rotatably stretched by a driving roller, a tension roller and a secondary transfer opposite roller 139. A secondary transfer roller 140 is provided so as to oppose the secondary transfer opposite roller 139, and a secondary transfer portion T2 is formed as a nip between the secondary transfer roller 140 and the secondary transfer opposite roller 139.

Below the intermediary transfer belt 130, a sheet feeding portion for feeding the sheet S to the secondary transfer portion T2 and the cassette feeding portion 150 for feeding the sheet S are provided. The cassette feeding portion 150 includes an upper cassette 150*a* and a lower cassette 150*b* which accommodate the sheets S and feeding units 151 for feeding the sheets S from the respective cassettes.

The printer main assembly 100A is provided with the manual feeding portion 210 in addition to the cassette feeding portion 150. The manual feeding portion 210 includes a manual feeding tray 212 on which a user manually sets the sheets and a feeding unit 213 for feeding the sheet from the manual feeding tray 212. A position of the sheet set on the manual feeding tray 212 is regulated by a side regulating plate 215. Further, the manual feeding tray 212 is provided with a sensor 211 for detecting that the sheet is set. The manual feeding portion 210 is used when images are formed on sheets in a relatively small number of sheets, for example about several tens of sheets.

The sheet feeding portion is principally constituted by a supply passage 131 and a discharge passage 231. The supply passage 131 is a feeding passage along which the sheet S fed from the cassette feeding portion 150, the manual feeding portion 210 or an option feeder 250 is fed to the secondary transfer portion T2. The discharge passage 231 is a feeding passage along which the sheet S after the image formation is fed to an outside of the printer main assembly 100A.

The supply passage 131 is provided with feeding roller pairs 153, 154 and 155, and a registration roller pair 161. On a side upstream of the registration roller pair 161 with respect to a feeding direction of the sheet S, a registration sensor 160 is provided. The registration sensor 160 is used for determining timing when the feeding of the sheet S once stopped by contact with the registration roller pair 161 is resumed and the image is transferred from the intermediary transfer belt 130 onto the sheet S.

Further, on a side (right-hand side in FIG. 1) of the printer main assembly 100A, the option feeder 250 is connected to the printer main assembly 100A. The option feeder 250 constitutes the image forming apparatus 100 (image forming system) in combination with the printer main assembly 100A.

The printer main assembly 100A and the option feeder 250 are connected to each other through a deck supply passage 132. The deck supply passage 132 is connected to the supply passage 131 on a side upstream of the feeding roller pair 154 and feeds the sheet S, accommodated in the option feeder 250, to the supply passage 131.

The option feeder 250 is capable of stacking many elongated sheets longer in size with respect to the sheet feeding direction than regular size sheets, in addition to the sheets with regular size such as A3 or A4. A user uses the option feeder 250 in the case where the image is formed on the sheet with a size other than the regular size or in the case where the image is formed on a sheet with a size different from the size(s) of the sheet(s) already accommodated in the upper cassette 150*a* and the lower cassette 150*b*. Further the option feeder 250 is larger in maximum number of sheets S stackable on the upper cassette 150*a* and the lower cassette 150*b*, and therefore, is also usable for the purpose of improving operational efficiency by, for example, reducing a frequency of surface supply. Details of the option feeder 250 will be specifically described later.

On the other hand, the discharge passage 231 is provided with a fixing device 170, and on a side downstream of the fixing device 170, a reverse passage 230 is connected to the discharge passage 231. Further, to the reverse passage 231, a double-side feeding passage 235 is connected. At a connecting portion between the discharge passage 231 and the reverse passage 230, a reverse flap 172 is provided. The reverse flap 172 divides a destination of the sheet S discharged from the fixing provided device 170, into a plurality of destinations.

The discharge passage 231 branches into an upper discharge passage 181 and a lower discharge passage 180 on a side downstream of the connecting portion thereof to the reverse passage 230, and a reverse flap 190 is provided at a branch portion. The reverse flap 190 divides a destination of the sheet S into the upper discharge passage 181 and the lower discharge passage 180. The upper discharge passage 181 permits discharge of the sheet S onto an upper discharge tray 196. The lower discharge passage 180 permits discharge of the sheet S onto a lower discharge tray 200. Each of the discharge passage 231, the reverse passage 230, the double-side feeding passage 235, the upper discharge passage 181 and the lower discharge passage 180 is provided with a feeding roller pair or a discharging roller pair.

Image Forming Operation

Next, an image forming operation by the image forming apparatus 100 will be described. When a job (print job) requiring the image forming apparatus 100 to output the instruction is inputted to the image forming apparatus 100, sheets are fed one by one to the feeding passage 131 from either one of the cassette feeding portion 150, the manual feeding portion 210 and the option feeder 250. At this time, on the basis of detection timing of the sheet S by feeding sensors 152 and 603, whether or not the sheet S is fed normally is discriminated.

The sheet S fed to the feeding passage 131 is fed toward the registration roller pair 161 by the feeding roller pairs 154 and 155 and the like. A leading end and a trailing end of the sheet S are detected by the registration sensor 160 at a position between the feeding roller pair 155 and the registration roller 161. The registration sensor 160 is used for controlling feeding of the sheet S by the registration roller pair 161 in synchronism with timing when the toner image carried on the intermediary transfer belt 130 reaches the secondary transfer portion T2. Further, the registration sensor 160 is also used as a means for detecting a length of the sheet S with respect to the feeding direction of the sheet S.

In each of the image forming stations Y to K of the process unit 120, the surface of the photosensitive drum 121 is electrically charged uniformly, and then an electrostatic latent image is formed on the drum surface by irradiating the drum surface with laser light emitted from the scanner unit 122. The electrostatic latent image carried on the photosensitive drum 121 is developed with toner supplied from the developing device, so that a toner image is formed on the surface of each of the photosensitive drums 121. Resultant toner images are successively transferred from the photosensitive drums 121 onto the intermediary transfer belt 130 at the primary transfer portions T1, so that the toner images of the respective colors are superposed on each other and thus a full-color toner image is formed on the intermediary transfer belt 130. The toner image formed on the intermediary transfer belt 130 is moved to the secondary transfer portion T2 by rotation of the intermediary transfer belt 130.

On the other hand, the sheet S detected at the leading end thereof by the registration sensor 160 contacts the registration roller pair 161 and stops. At this time, the sheet S forms a loop shape (flexure) by being fed in a predetermined amount in a state in which the leading end of the sheet S is abutted against the registration roller pair 161, so that oblique movement of the sheet S is corrected. As regards the sheet S subjected to the correction of the oblique movement, in consideration of a time when the leading end of the sheet S reaches the registration sensor 160 and a time required for forming the loop for registration, feeding of the sheet S is resumed so that a leading end of an effective print region and the leading end of the toner image on the intermediary transfer belt 130 coincide with each other at the secondary transfer portion T2.

To the sheet S having reached the secondary transfer portion T2 and the toner image on the intermediary transfer belt 130, a transfer voltage is applied from the secondary transfer roller. By this, the toner image is transferred from the intermediary transfer belt 130 onto the sheet S. The sheet Son which the toner image is transferred is fed to the fixing device 170. The sheet S fed into the fixing device 170 is heated and pressed, whereby the toner image is fixed on the sheet S. The sheet S on which the toner image is fixed is fed toward an outlet of the printer main assembly 100A.

Incidentally, when the leading end of the sheet S on which the toner image is transferred reaches a feeding sensor 171 provided on a side upstream of the fixing device 170, a designation of the sheet S is switched between the reverse passage 230 and the discharge passage 231 in accordance with an instruction of the print job. In the case of a double-side printing job in which images are formed on double surfaces (sides) of the sheet S, the surface S is fed to the reverse passage 230, and in a state in which a front surface and a back surface of the sheet S are changed to each other, the sheet S is fed again toward the secondary transfer portion T2, and then the image is formed on the back surface of the sheet S. In the case of a one-side printing job or back-side printing in the double-side printing job, the sheet S is fed to the discharge passage 231.

The sheet S fed to the discharge passage 231 is fed by a feeding roller pair 232 and is guided by the reverse flap 190 positioned in accordance with the instruction of the print job, so that the sheet S is fed to the lower discharge passage 180 or the upper discharge passage 181. In the case where a discharge destination is the lower discharge tray 200, the sheet S is fed to the lower discharge passage 180, and in the case where the discharge destination is the upper discharge tray 196, the sheet S is fed to the upper discharge passage 181. Further, to the image forming apparatus 100A, a sheet processing device for subjecting the image formed sheet to binding or the like is connected, the sheet is delivered from the lower discharge passage 180 to the sheet processing device.

Incidentally, the above-described process unit 120 is an example of an image forming means, and may also be an electrophotographic unit of a monochromatic type or may also be of another printing type such as an ink jet type.

Option Feeder

Next, a structure of the option feeder 250 which is a sheet feeding device in this embodiment will be described. Part (a) of FIG. 2 is an enlarged sectional view of the option feeder 250 in the image forming apparatus 100 of FIG. 1. The option feeder 250 includes a casing 250A as a housing and an accommodating portion unit 508 openable and closable relative to the casing 250A. The accommodating portion unit 508 includes a box-like accommodating portion main body 506 for accommodating a large number of sheets S, a lifter plate (lift plate) 507 mounted in the accommodating portion main body 506 so as to be capable of being lifted and lowered, and a lifting mechanism 530 for lifting and lowering the lifter plate 507. The accommodating portion unit 508 is an accommodating portion in this embodiment, and the lifting mechanism 530 is a lifting and lowering means in this embodiment.

At an upper portion of the option feeder 250, a pick-up roller 501 and a separation and feeding roller 502 which constitute an upstream portion of the deck supply passage 132. The pick-up roller 501 which is a feeding means in this embodiment is provided above the lifter plate 507 and contacts a top surface of an uppermost sheet of the sheets S stacked on the lifter plate 507, and feeds the sheet S toward the separation and feeding roller 502. The separation and feeding roller 502 feeds the sheet S, received from the pick-up roller 501, toward the feeding roller pair 504 of the printer main assembly 100A. At this time, a separation roller opposing the separation and feeding roller 502 exerts frictional force on the sheet entering a nip between itself and the separation and feeding roller 502, and thus prevents double (multiple-)feeding of the sheets other than the sheet contacting the separation and feeding roller 502. The separation roller is, for example, a retard roller to which rotational drive (rotation driving force) with respect to, for example, a direction opposite to the feeding direction of the sheet S, but another separation member (for example, a pad-like frictional member) may also be used.

Part (b) of FIG. 2 is a schematic view showing a structure of the lifter plate 507 and the lifting mechanism 530 for lifting and lowering the lifter plate 507. As shown in parts (a) and (b) of FIG. 2, the lifting mechanism 530 in this embodiment includes two wires 530*a* and 530*e*, a plurality of pulleys 530*b*, 530*c*, 530*f* and 530*g*, a wire winding-up shaft 532, and a lifter motor M500.

The lifter plate 507 is hung by the wire 530*a* at one end portion thereof, and is hung by the wire 530*e* at the other end portion thereof, so that the lifter plate 507 is supported in a substantially horizontal attitude. The wires 530*a* and 530*e* are wound about the pulleys 530*b* and 530*c* and about the pulleys 530*g* and 530*f*, respectively, and end portions thereof opposite from connecting portions thereof to the lifter plate 507 are fixed to wire pulleys 530*d* and 530*h*, respectively, provided on the wire winding-up shaft 532. The wire winding-up shaft 532 is connected to an output shaft of the lifter motor M500. Accordingly, by power of the lifter motor M500 which is a driving source, winding-up and feeding of the wires 530*a* and 530*e* by the wire winding-up shaft 532 are carried out, so that the lifter plate 507 is lifted and lowered.

The lifter motor M500 is provided in the accommodating portion unit 508, and when the accommodating portion unit 508 is opened and closed, the lifter motor M500 moves together with the accommodating portion unit 508 relative to the casing 250. The lifter motor M500 is connected to a power source provided on the casing 250A side through a flexible cable following movement of the accommodating portion unit 508, and is moved by electric power supplied from the power source. Incidentally, in part (b) of FIG. 2, the wire winding-up shaft 532 is directly connected to the output shaft of the lifter motor M500 but may also be connected to the lifter motor output shaft through a transmission mechanism such as a gear train. Further, as the lifter motor M500, for example, a DC mode can be used. The lifter motor M500 is a mode in this embodiment, and the wire winding-up shaft 532 is a winding-up shaft in this embodiment.

Incidentally, the pulley 530*b* is shaft-supported by a supporting member 531*b*, the pulley 530*c* is shaft-supported by a supporting member 531*c*, the pulley 530*f* is shaft-supported by a supporting member 531*f*, and the pulley 530*g* is shaft-supported by a supporting member 531*g*. The respective supporting members 531*b*, 531*c*, 531*f* and 531*g* are connected (fixed) to an inner wall of the accommodating portion unit 508. As the supporting members 531*b*, 531*c*, 531*f* and 531*g*, for example, metal plate members secured to the inner wall of the accommodating portion unit 508 with screws can be used.

In this embodiment, the lifting mechanism 530 for lifting and lowering the lifter plate 507 by the two wires is described as an example, but the number of the wires may be changed or a lifting and lowering means of a type other than the wire type may also be used. For example, a constitution in which upper and lower belts are stretched around pulleys supported by a frame of the accommodating portion unit 508 and in which the lifter plate 507 is not only fixed to the belts but also lifted and lowered by rotationally driving the belts by a mode may also be employed.

In the accommodating portion unit 508, a space above the lifter plate 507 and enclosed by the inner wall of the accommodating portion unit 508 is a sheet accommodating portion. At an uppermost portion of the sheet accommodating portion, a sheet presence/absence sensor 601 and a feeding position sensor 602 are provided. The sheet presence/absence sensor 601 is a sensor for detecting whether or not at least one sheet S is present on the lifter plate 507. The feeding position sensor 602 is a sensor for detecting that a top surface of the sheets S stacked on the lifter plate 507 (or an upper surface of the lifter plate 507 in the case where there is no sheet on the lifter plate 507) is in a position (feeding position) where the pick-up roller 501 contacts and feeds the uppermost sheet.

As the sheet presence/absence sensor 601 and the feeding position sensor 602, an optical sensor constituted by a flag member swingable by being pressed against the sheet S and a photo-interrupter light-blocked by a light-blocking portion provided on the flag member can be used. Then, for example, at a position of the lifter plate 507 corresponding to a flag member (A) of the sheet presence/absence sensor 601, a cut-away portion is provided, so that the lifter plate 507 and the flag member (A) are prevented from interfering with each other. On the other hand, at a position of the lifter plate 507 corresponding to the flag member (B) of the feeding position sensor 602, no cut-away portion is provided, so that the lifter plate 507 is made contactable to the flag member (B).

In this case, when the lifter plate 507 is lifted in a state in which at least one sheet is stacked on the lifter plate 507, both the sheet presence/absence sensor 601 and the feeding position sensor 602 are in a state (ON state) in which these sensors detect that their flag members are swung by being pressed by the sheet S. When the lifter plate 507 is lifted in a state in which no sheet is stacked on the lifter plate 507, the sheet presence/absence sensor 601 is in an OFF state and the feeding position sensor 602 is in the ON state. In the case where the sheet(s) S on the lifter plate 507 and the lifter plate 507 do not reach the feeding position (in the case where there is room to lift the lifter plate 507), both the sheet presence/absence sensor 601 and the feeding position sensor 602 are in the OFF state. Accordingly, a CPU 301 (FIG. 3) described later is capable of acquiring pieces of information indicating presence or absence of the sheet on the lifter plate 507 and the top surface position of the sheet(s) stacked on the lifter plate 507, on the basis of patterns of detection states of these sensors In the case where a print job in which the sheet S is supplied form the option feeder 250 to the printer main assembly 100A of the image forming apparatus 100 and in which the image is formed on the sheet S, a lifting operation of the lifter plate 507 is performed. That is, the lifter motor M500 rotates the wire winding-up shaft 532, and thus the wire pulleys 530*d* and 530*h* wind up the wires 530*a* and 530*e*, so that the lifter plate 507 is lifted. When the state of the feeding position sensor 602 changes from the OFF state to the ON state and the sheet presence/absence sensor 601 is in the ON state, the CPU 301 discriminates that the sheet S is present on the lifter plate 507 and the top surface of the sheet reaches the feeding position. Then, a feeding mode which is a driving source for the pick-up roller 501 and the separation and feeding roller 502 starts rotation thereof. By this, the sheets S stacked on the lifter plate 507 are fed one by one to the supply passage 131 through the deck supply passage 132 including the pick-up roller 501, the separation and feeding roller 502 and the feeding roller pair 504.

During execution of the print job, on the basis of a detection result of the feeding position sensor 602, the CPU 301 monitors the top surface position of the sheet S in the option feeder 250. Then, when the state of the feeding position sensor 602 changes from the ON state to the OFF state by consumption of the sheets S, the CPU 301 discriminates that the top surface position of the sheet S lowers from the feeding position, so that the CPU 301 drives the lifter motor M500 again so that the top surface of the sheets S is lifted to the feeding position. Thus, during execution of the print job, control such that the top surface position of the sheets S in the option feeder 250 is kept at a substantially constant level is carried out.

The accommodating portion unit 508 including the accommodating portion main body 506 is openable and closable relative to the casing 250A. A state in which the accommodating portion unit 508 is closed (closed state of the accommodating portion unit 508) refers to a state in which the accommodating portion unit 508 is inserted to a predetermined mounting position of the casing 250A so that feeding of the sheets S can be executed. Further, a state in which the accommodating portion unit 508 is open (open state of the accommodating portion unit 508) refers to a state in which the accommodating portion unit 508 is pulled out of the casing 250A so as to enable replenishment and exchange of the sheet S. Incidentally, in the open state of the accommodating portion unit 508, a state in which a latch member 321 for locking the accommodating portion unit 508 to the closed state is released and thus the user is capable of manually pulling out to a position where the user has access to the sheet accommodating portion is included. In the following, irrespective whether or not the entirety of the sheet accommodating portion is pulled out to an outside of the casing 250A, the state in which the accommodating portion unit 508 is pulled out and the state in which the accommodating portion unit 508 is pullable out are referred to as the open state. Further, the state in which the accommodating portion unit 508 is locked to the mounting position of the casing 250A is referred to as the closed state.

The casing 250A is provided with an accommodating portion open button 510, and the user presses the accommodating portion open button 510, whereby locking of the accommodating portion unit 508 to the casing 250A is released. Specifically, an accommodating portion open solenoid 610 (FIG. 3) which is an actuator is actuated, so that the latch member 321 physically latching the casing 250A and the accommodating portion unit 508 is moved, so that the accommodating portion unit 508 is capable of being pulled out to a front side in part (a) of FIG. 2. An accommodating portion open solenoid 610 is an openable (open/close) means for switching the state of the accommodating portion unit 508 in this embodiment between the open state and the closed state, and the accommodating portion open button 510 is an open instruction means in this embodiment for sending a signal (open instruction) providing an instruction to open the accommodating portion. Incidentally, the accommodating portion open button 510 is an example of the open instruction means, and an open instruction may also be provided by pressing a button of a display operation portion 310. In this case, the display operation portion 310 functions as the open instruction means. Further, a constitution in which the open of the accommodating portion can be instructed through an external device connected through an external I/F 309.

Incidentally, at the contact portions of the accommodating portion unit 508 and the casing 250A, urging portions such as spring members for urging the accommodating portion unit 508 in the pulling-out direction can be provided. In this case, when the latch member 321 is released by pressing-down of the accommodating portion open button 510, the accommodating portion unit 508 starts to automatically move in the pulling-out direction relative to the casing 250A. For that reason, an operation load of the user is reduced, and in addition, the open state of the accommodating portion unit 508 is quite obvious to the eyes of the user.

Further, the casing 250A is provided with an accommodating portion open/close sensor 608. The accommodating portion open/close sensor 608 detects whether or not the accommodating portion unit 508 is in the pulled-out state. In the case where the accommodating portion unit 508 is pulled out, the accommodating portion open/close sensor 608 is turned on. Further, in the case where the accommodating portion unit 508 is not pulled out (i.e., in the case where the accommodating portion unit 508 is accommodated in a mounting position of the casing 250A), the accommodating portion open/close sensor 608 is turned off.

Further, the accommodating portion unit 508 is provided with a supply position sensor 605, a bottom position sensor 604 and a bottom position sheet presence/absence sensor 606.

The supply position sensor 605 which is an intermediary detecting means in this embodiment is provided on the inner wall (a side surface of the lifter plate 507) of the accommodating portion main body 506. The supply position sensor 605 detects that the top surface of the sheets stacked on the lifter plate or the upper surface of the lifter plate is in a detection range between an upper-limit position and a lower-limit position of the lifter plate 507 in the accommodating portion main body 506 and is in an ON state. In the case where each of the sheets stacked on the lifter plate 507 and the lifter plate 507 is not in the supply position (the lower-limit position of the detection range), the supply position sensor 605 is in an OFF state. That is, at the time when the state of the supply position sensor 605 changes from the ON state to the OFF state during lowering of the lifter plate 507, it is understood that the top surface of the sheets stacked on the lifter plate 507 (the upper surface of the lifter plate 507 in the case where there is no sheet on the lifter plate 507). In normal open control described later, a lowering operation of the lifter plate 507 is stopped at the time when the top surface of the sheet or the upper surface of the lifter plate 507 is lowered to the supply position, so that the supply of the sheet by the user is made easy and thus convenience can be enhanced.

As the supply position sensor 605, an optical sensor including a flag member which has a certain length with respect to a vertical direction and which projects toward an inside of the accommodating portion main body 506 and a photo-interrupter light-blocked by a light-blocking portion provided on this flag member. In this case, the length of the flag member defines a detection range, and a lower end portion of the flag member is the supply position. In the case where the sheet on the lifter plate 507 or the lifter plate 507 is present at a height not less than the supply position, the flag member is pressed by the sheet or the lifter plate 507, and is retracted from an inside space (sheet accommodating portion) of the accommodating portion main body 506. On the other hand, when the sheet and the lifter plate 507 is in a position lower than the supply position, the flag member projects toward the inside of the accommodating portion main body 506 without being obstructed by the sheet and the lifter plate 507. Accordingly, a detection state of the photo-interruptor changes depending on whether at least one of the sheet and the lifter plate 507 is in a position equal to or higher than the supply position or in a position lower than the supply position. Incidentally, in this embodiment, the optical sensor using the flag member was described as an example, but by another known detecting mechanism, detection that the top surface of the sheet stacked on the lifter plate 507 or the upper surface of the lifter plate 507 is in the supply position may also be made.

The bottom position sensor 604 is provided at the bottom of the accommodating portion main body 506. The bottom position sensor 604 is constituted so that the bottom position sensor 604 is turned on when the lifter plate 507 is positioned at the bottom of the accommodating portion main body 506 (i.e., the lower-limit position of the lifter plate 507 in the accommodating portion main body 506) and so that the bottom position sensor 604 is turned off when the lifter plate 507 is not positioned at the bottom of the accommodating portion main body 506. As the bottom position sensor 604, a switch which actuates in contact with the lower portion of the lifter plate 507 or a photo-interruptor light-blocked by a light-blocking portion provided at the lower portion of the lifter plate 507.

Further, the bottom position sheet presence/absence sensor 606 is also provided at the bottom of the accommodating portion main body 506. The bottom position sheet presence/absence sensor 606 is constituted so that the bottom position sheet presence/absence sensor 606 is turned on when the sheets are stacked on the lifter plate 507 in a state in which the lifter plate 507 is positioned at the bottom of the accommodating portion main body 506 and so that the bottom position sheet presence/absence sensor 606 is turned off when no sheet is stacked on the lifter plate 507 in the state in which the lifter plate 507 is positioned at the bottom of the accommodating portion main body 506. As the bottom position sheet presence/absence sensor 606, for example, an optical sensor which includes a flag member swingable depending on presence or absence of the sheet in the state in which the lifter plate 507 is positioned at the bottom of the accommodating portion main body 506 and which includes a photo-interruptor light-blocked by a light-blocking portion of the flag member. In the state in which the lifter plate 507 is positioned at the bottom of the accommodating portion main body 506, the flag member is disposed so as to project upward from the upper surface of the lifter plate 507 through an opening provided in the lifter plate 507 and is swung downward by being pressed by the sheet.

Control Constitution of Image Forming Apparatus

Next, a control constitution of the image forming apparatus 100 provided with the above-constituted option feeder 250 will be described. FIG. 3 is a block diagram showing the control constitution of the image forming apparatus 100 of FIG. 1. In FIG. 3, the image forming apparatus 100 includes a CPU circuit portion 300. The CPU circuit portion 300 includes the CPU 301, a ROM 302, a RAM 303 and a timer 312. The CPU 301 is connected to the ROM 302 and the RAM 303 through an address bus or a data bus.

The CPU circuit portion 300 is connected to the display operation portion 310 and a printer controller 304, and the printer controller 304 is connected to an image signal controller 308 and the external I/F (interface) 309 through the image signal controller 308. Further, the printer controller 304 is connected to each of a sheet feeding portion 305, an image forming portion 306 and an accommodating portion controller 311. Further, the image signal controller 308 is also connected directly to the CPU circuit portion 300.

The accommodating portion controller 311 is connected to each of the lifter motor M500, the accommodating portion open button 510, the sheet presence/absence sensor 601, the feeding position sensor 602 and the accommodating portion open/close sensor 608. The accommodating portion controller 311 is connected to each of the bottom position sensor 604, the supply position sensor 605, the bottom position sheet presence/absence sensor 606, a lifter motor over current detecting sensor 609 and the accommodating portion open solenoid 610. The accommodating portion controller 311 is a control circuit including a processor and volatile and non-volatile memories.

The CPU 301 reads and executes a control program stored in the ROM 302, so that the CPU 301 controls the entirety of the image forming apparatus 100. The ROM 302 stores the control programs. The ROM 302 is an example of a non-transient storing medium in which the control programs for operating the sheet feeding device and the image forming apparatuses are stored and which is readable by a computer. In the RAM 303, data used for control is written. Incidentally, the RAM 303 is a rewritable memory and includes a non-volatile storing area such as EEPROM. On the basis of an instruction from the CPU 301, the printer controller 304 provides an instruction to form the image to the image forming portion 306. The image forming portion 306 forms the image on the basis of a video signal inputted from the printer controller 304. Further, on the basis of the instruction from the CPU 301, the printer controller 304 controls the sheet feeding portion 305, so that the sheet is fed and conveyed. The image signal controller 308 subjects digital image signals, inputted through the external I/F 309, to various processes during the printing operation, and then converts the processed digital image signals into video signals, so that the converted video signals are stored in the RAM 303.

The display operation portion 310 which is a user interface of the image forming apparatus 100 is an operating portion in this embodiment. The display operation portion 310 includes a display such as a liquid crystal panel for displaying an image, bottoms such as a print start bottom and ten keys, and a touch panel, and functions as an input means through which the user is capable of inputting information to the image forming apparatus 100 and as a display means presenting information to the user. The CPU 301 controls contents of information displayed on the display operation portion 310 and receives information inputted by the user, so that the CPU 301 makes settings relating to functions, operation conditions and the like of the image forming apparatus 100 and setting (print setting) when a print job is executed. For example, the display operation portion 310 receives instructions from the user, such as selection of a color mode, input of sheet information, a copy start and the like when the image formation is carried out. Further, the display operation portion 310 has a function of displaying a state, a warning message and the like of the image forming apparatus.

The accommodating portion controller 311 receives pieces of information from the feeding position sensor 602, the accommodating portion open/close sensor 608, the supply position sensor 605, the accommodating portion open button 510, the bottom position sensor 604, and the sheet presence/absence sensor 601. Further, on the basis of the instruction from the CPU 301 the accommodating portion controller 311 controls the lifter motor M500 and thus controls the position of the sheet in the accommodating portion main body 506. That is, the CPU controller 300 and the accommodating portion controller 311 function in cooperation with each other as a control means for controlling the option feeder 250.

Mode of Accommodating Portion Open Control

Next, a mode in an operation of the option feeder 250 when the accommodating portion open button 510 is pressed in a state in which the accommodating portion unit 508 is closed will be described.

First, a normal open mode which is a first open mode in this embodiment will be described. Parts (a) and (b) of FIG. 4 are sectional views showing the option feeder 250 as seen from a right-hand side of part (a) of FIG. 2. As shown in part (a) of FIG. 4, when the user presses down the accommodating portion open button 510 in a state in which the accommodating portion unit 508 is closed, in the operation in the normal open mode, locking between the casing 250A and the accommodating portion unit 508 is released. Then, as shown in part (b) of FIG. 4, the accommodating portion unit 508 is drawn from the casing 250A.

In the operation in the normal open mode, after the state of the accommodating portion unit 508 is switched from the closed state to the open state, the lifter plate 507 is subjected to lifting and lowering control so that the top surface of the sheets stacked on the lifter plate 507 (the upper surface of the lifter plate 507 in the case where there is no sheet on the lifter plate 507 is maintained at the supply position. Thus, the lifter plate 507 is maintained at a proper height, so that the user can easily carry out replenishment and exchange of the sheets.

Incidentally, after the accommodating portion unit 508 is opened in the operation in the normal open mode, in a state in which the lifter plate 507 is maintained at the proper height, it would be also considered that sheets in a large amount are stacked on the lifter plate 507 at one time. The sheets in the large amount refer to sheets, for example, in an amount which exceeds a height from the upper surface of the lifter plate 507 positioned at the supply position to an upper stacking limit of the sheets in the accommodating portion main body 506.

In the operation in the normal open mode, it is typically assumed that the user supplies the sheets every one package (for example, 500 sheets of plain paper). On the other hand, for the purpose of shortening an operation time of sheet supply by the user or for the like purpose, it would be also considered that the user intends to stack, for example, sheets in an amount corresponding to several packages collectively. In such a case, even when the lifter plate 507 is maintained at the supply position, an advantage such that the sheet supply is made easy is not readily obtained. On the other hand, the sheets in the large amount are stacked on the lifter plate 507 at one time, so that a relatively large load is exerted on the lifting mechanism 530.

FIG. 5 is a conceptual view showing loads exerted on constituent elements of the lifting mechanism 530 by forces received by the lifter plate 507 when the sheets in the large amount are stacked at one time on the lifter plate 507. When a sheet bundle S1 in the large amount is stacked at one time on the lifter plate 507, a relatively large downward force N1 acts on the lifter plate 507 by a weight of the sheet bundle S1 and the inertia of the sheet bundle S1 lowered.

By this force N1, loads are exerted on the respective members constituting the lifting mechanism 530, so that stress acts on the respective members. For example, downward forces N2, N3, N4 and N5 are exerted on the supporting members 531*b*, 531*c*, 531*f* and 531*b* supporting the wires 530*a* and 530*e* through the pulleys 530*b*, 530*c*, 530*f* and 530*g*. Accordingly, as the supporting members 531*b*, 531*c*, 531*f* and 531*g*, supporting members having strength not causing deformation and breaking due to stress generated by the forces N2, N3, N4 and N5 when the sheet supply normally carried out by the user is assumed. Similarly, also as regards the wires 530*a* and 530*e*, the pulleys 530*b*, 530*c*, 530*f* and 530*g*, and the wire winding-up shaft 532 and the like on which stress due to the force N1 is actable, those having strength not causing the deformation and breakage due to the stress are used.

Incidentally, a magnitude of the force N1 fluctuates depending on momentum of an operation of lowering the sheet bundle S1 by the user. Accordingly, in order not to exert an overload on the supporting members 531*b* and the like, in the case where the user intends to constitute the lifting mechanism 530 so as to not to exert the overload on the supporting members even when the user supplies the sheet in any manner, each of the members is provided with strength move than necessary. However, the supporting members 531*b* and the like are provided each strength only for meeting a relatively rare case, and therefore, as a result, it leads to increase in size, weight and cost of the option feeder 250.

Therefore, in this embodiment, as a mode of control (accommodating portion open control) when the accommodating portion open button 510 is pressed down, in addition to the normal open mode, an open mode after lifter lowering is prepared. When the normal open mode is a first mode, the open mode after lifter lowering is a second mode. Parts (a), (b) and (c) of FIG. 6 are sectional views, showing the option feeder 250 as seen from the right-hand side of part (a) of FIG. 2, for illustrating contents of the open mode after lifter lowering.

Part (a) of FIG. 6 shows a state in which the accommodating portion unit 508 is closed. In this state, when the user presses down the accommodating portion open button 510, in an operation in the open mode after lifter lowering, as shown in part (b) of FIG. 6, a lowering operation of the lifter plate 507 is started while maintaining the closed state of the accommodating portion unit 508. Then, when the bottom position sensor 604 detects that the lifter plate 507 reaches the lower-limit position (the bottom of the accommodating portion main body 506), the locking between the casing 250A and the accommodating portion unit 508 is released, so that the accommodating portion unit 508 is drawn out shown in part (c) of FIG. 6.

Thus, when the accommodating portion open button 510 is operated, before the locking between the casing 250A and the accommodating portion unit 508 is released, the lifter plate 507 is moved to the lower-limit position of the accommodating portion main body 506 in advance. This is the operation in the open mode after lifter lowering.

In the operation in the open mode after lifter lowering, when the sheet supply by the user is carried out, the lifter plate 507 is in the lower-limit position and is supported by the bottom portion (supporting portion) of the accommodating portion main body 506. For this reason, even if the user stacks the sheet bundle in the large amount on the lifter plate 507 at one time, the force N1 (FIG. 5) received by the lifter plate 507 is distributed to the bottom portion of the accommodating portion main body 506. For that reason, compared with the operation in the normal open mode in which there was a need to receive the force N1 principally by the lifting mechanism 530, the overload is not readily exerted on the constituent elements of the lifting mechanism 530 including the supporting member 531*b*. Accordingly, durability of the accommodating portion unit 508 as a whole can be ensured without changing the strength of the supporting members 531*b* and the like. Further, for users employing a supplying method in which sheets in a large amount are supplied at one time, it would be considered that the operation in the open mode after lifter lowering is not inferior in convenience to the operation in the normal open mode.

Control Method of Option Feeder

In the following, a control method of the option feeder 250, in this embodiment, capable of switching operations in a plurality of modes including the normal open mode (first mode) and the open mode after lifter lowering (second mode), as a mode defining the operation when the accommodating portion open button 510 is operated will be described. Incidentally, description will be made that the operation of the option feeder 250 in this embodiment is switched between the two modes consisting of the first mode and the second mode, but may also be switchable to another mode. Further, the following process is periodically executed by the CPU 301 mounted in the printer main assembly 100A.

FIG. 7 is a flowchart showing a process in which on the basis of preset mode setting, the accommodating portion unit 508 is opened in response to pressing-down of the accommodating portion open button 510 by the operation in the normal open mode or in the open mode after lifter lowering. The CPU 301 checks whether or not the accommodating portion unit 508 is accommodated in a predetermined mounting position of the casing 250A by checking the accommodating portion open/close sensor 608 (S10). In the case where the CPU 301 discriminated that the accommodating portion unit 508 is not accommodated (is not in the closed state), the control is ended as it is. In the case where the CPU 301 discriminated that the accommodating portion unit 508 is accommodated (is in the closed state), the CPU 301 checks whether or not an output state of the accommodating portion open button 510 is changed from an ON state to an OFF state (S11).

When the accommodating portion open button 510 is not changed in state from the ON state to the OFF state, the CPU 301 is capable of discriminating that the accommodating portion open button 510 is not pressed down by the user, so that the control is ended as it is. On the other hand, when the accommodating portion open button 510 is changed in state from the ON state to the OFF state, the CPU 301 is capable of discriminating that the accommodating portion open button 510 is pressed down. In this case, the CPU 301 checks whether or not by the mode setting of the accommodating portion open control stored in the RAM 303 is the normal open mode (S12). Incidentally, a mode setting method of the accommodating portion open control will be described later. In S12, in the case where the normal open modes set, normal open control is carried out (S13). In S12, in the case where the open mode after lifter lowering is set, open control after lifter lowering is carried out (S14).

Normal Open Control

Next, a procedure of the accommodating portion open control (normal open control) by the operation in the normal open mode will be described using FIG. 8. When the normal open control is started, first, the CPU 301 performs a process of switching the state of the accommodating portion unit 508 from the closed state to the open state. Specifically, locking between the casing 250A and the accommodating portion unit 508 is released by moving a latch member 321 locking the accommodating portion unit 508 to the casings 250A by turning an accommodating portion open solenoid 610 on (energization) (S21). Then, the CPU 301 waits for a time t1 in which sufficient pulling of the accommodating portion open solenoid 610 can be confirmed (S22). After waiting for the time t1, the accommodating portion open solenoid 610 is turned off (stop of the energization) (S23). In the timed, it is assumed that the accommodating portion unit 508 is moved in a drawing direction to a position where the accommodating portion unit 508 is not locked by the latch member 321 even when the accommodating portion open solenoid 610 is returned to an original position.

Next, the CPU 301 checks whether or not the sheet remains in the accommodating portion main body 506 (S24). Whether or not the sheet remains in the accommodating portion main body 506 is discriminated by checking the output state of the sheet presence/absence sensor 601 stored in the RAM 303 before the normal open control is carried out. Incidentally, by a relative position of the lifter plate 507 in the accommodating portion main body 506, the presence or absence of the sheet may also be discriminated.

In the case where the CPU 301 discriminated that the sheet does not remain in the accommodating portion main body 506, the control in this embodiment is ended. In the case where the CPU 301 discriminated that the sheet remains in the accommodating portion main body 506, drive of the lifter motor M500 is started in a direction of lowering the lifter plate 507 (S25). Next, the lowering operation of the lifter plate 507 is continued while checking stop conditions of S26 and S27. In S26, whether or not a state of the supply position sensor 605 is changed from the ON state to the OFF state, i.e., whether or not the top surface of the remaining sheet(s) lowers to the supply position by the lowering of the lifter plate 507. In S27, whether or not a state of the bottom position sensor 604 is changed from the OFF state to the ON state, i.e., whether or not the lifter plate 507 reached the lower-limit position of the accommodating portion main body 506. In a period in which both of the conditions in S26 and S27 are not satisfied, the lowering of the lifter plate 507 is continued, and when either one of the conditions in S26 and S27 is satisfied, the drive of the lifter motor M500 is stopped and thus the lowering of the lifter plate 507 is stopped (S28). Thus, a normal open control flow is ended.

Incidentally, when the sheet bundle is set on the lifter plate 507 after the top surface of the remaining sheet(s) or the lifter plate 507 lowers to the supply position in the step (S26: Y), the state of the supply position sensor 605 changes from the OFF state to the ON state. In this case, the processes which are the same contents as those in S25 to S28 are executed, so that the top surface of the sheets after being supplied lowers to the supply position or the lifter plate 507 lowers until the lifter plate 507 reaches the lower-limit position of the accommodating portion main body 506. By this the top surface position of the sheets on the lifter plate 507 is maintained at a height where the user is easy to supply the sheets. Further, in this embodiment, the lifter plate 507 starts to lower after the state of the accommodating portion unit 508 switches to the open state in the operation in the normal open mode, but switching between the open state and the closed state may also be carried out in parallel to the lowering of the lifter plate 507.

Open Control after Lifter Lowering

Next, by using FIG. 9, a procedure of accommodating portion open control (open control after lifter lowering) by the operation in the open mode after lifter lowering will be described. When the open control after lifter lowering is started, first, the CPU 301 causes the lifter motor M500 to start to drive in a direction in which the lifter plate 507 lowers (S31). Different from the operation in the normal open control, at this time, the accommodating portion open solenoid 610 is not turned on, so that the accommodating portion unit 508 is kept in the closed state.

Then, the CPU 301 checks whether or not the state of the bottom position sensor 604 changed from the OFF state to the ON state, i.e., whether or not the lifter plate 507 reached the lower-limit position of the accommodating portion main body 506 (S32). The lowering of the lifter plate 507 is continued in a period in which the lifter plate 507 does not reach the lower-limit position of the accommodating portion main body 506, and in the case where the lifter plate 507 reached the lower-limit position, the CPU 301 causes the lifter motor M500 to stop the drive of the lifter motor M500, and thus causes the lifter plate 507 to stop (S33).

Next, the CPU 301 performs a process of switching the state of the accommodating portion unit 508 from the closed state to the open state. Specifically, locking between the casing 250A and the accommodating portion unit 508 is released by moving a latch member 321 locking the accommodating portion unit 508 to the casings 250A by turning an accommodating portion open solenoid 610 on (S34). Then, the CPU 301 waits for a time t1 in which sufficient pulling of the accommodating portion open solenoid 610 can be confirmed (S35). After waiting for the time t1, the accommodating portion open solenoid 610 is turned off (S36). By the above, a flow of the open control after lifter lowering is ended.

Thus, in the open control after lifter lowering, in the case where the accommodating portion open button 510 is pressed down, the lifter plate 507 is lowered to the lower-limit position in the accommodating portion main body 506, and thereafter, the state of the accommodating portion unit 508 is constituted so that the state thereof is switched from the closed state to the open state.

Incidentally, depending on a detection range of the bottom position sensor 604, it would be considered that the state of the bottom position sensor 604 becomes the ON state before the lifter plate 507 contacts the bottom portion of the accommodating portion main body 506. In this case, the drive of the lifter motor M500 is stopped by providing a slight time after the state of the bottom position sensor 604 becomes the ON state, so that the lifter plate 507 stops in a state in which the lifter plate 507 is supported by the bottom portion of the accommodating portion main body 506. On the other hand, a period from the time when the state of the bottom position sensor 604 becomes the ON state until the drive of the lifter motor M500 stops is short, and therefore, a process in which the state of the accommodating portion unit 508 is changed to the open state may also be started at the time when the state of the bottom position sensor 604 becomes the ON state. That is, in FIGS. 9, S33 and S34 may also be changed to each other. Even when such a constitution is employed, the lifter plate 507 can be expected to become the state of contacting the bottom portion of the accommodating portion main body 506 until the accommodating portion unit 508 is drawn out, so that an advantage such that durability of the option feeder 250 is improved is achieved.

Mode Switching Method of Accommodating Portion Open Control

Next, a method of switching mode setting of the accommodating portion open control will be described. In this embodiment, a service person (or the user him(her)self) is capable of switching the mode setting of the accommodating portion open control through the display operation portion 310.

FIG. 10 is a schematic view showing a mode switching screen for changing the mode setting of the accommodating portion open control in the display connect operation portion 310. On the mode switching screen, a normal mode bottom 701 showing the normal open mode and an "open after lifter lowering" bottom 702 showing the open mode after lifter lowering are displayed as selectable bottoms. Incidentally, when each of the modes is selected, the selected mode bottom (in this embodiment, the "open after lifter lowering" bottom 702) is highlighted in black as shown in FIG. 10. When an end bottom 703 is pressed down in a state in which either one of the bottoms is selected, information on mode setting is stored in the RAM 303, so that the mode setting of the accommodating portion open control is completed.

Incidentally, as regards the switching method of the accommodating portion open mode, the display operation portion 310 may also be directly connected to the option feeder 250 (not as a value interface of entirety of the image forming apparatus). Further, a constitution in which the mode switching of the accommodating portion open control can be made by input from an information processing terminal (personal computer, smartphone or the like) connected to a network through the external I/F 309 may also be employed.

Further, in place of the switching method through the screen display, for example, a toggle switch is provided on the option feeder 250 and depending on the position of this toggle switch, the normal open mode and the open mode after lifter lowering may also be switched to each other.

Embodiment 2

An embodiment 2 will be described. This embodiment is different from the embodiment 1 in that the mode switching of the accommodating portion open control in the option feeder is automatically performed. In the following, constituent elements represented by reference numerals or symbols common to the embodiments 1 and 2 substantially have the same constitutions and functions as those described in the embodiment 1.

In this embodiment, as a default, the normal open mode is set. In a state in which the normal open mode is not, for example, when impact more than assumption is exerted such that the user vigorously stacks a large amount of the sheet bundle on the lifter plate 507 at one time, there is a possibility that an over load acts on constituent elements of the lifting mechanism 530 including the supporting member 531*b* and the like. Therefore, in this embodiment, in the operation in the normal open mode, a magnitude of the load exerted on the lifting mechanism 530 is monitored, and in the case where the CPU 301 discriminated that the load (overload) which is a threshold or more is exerted on the lifting mechanism 530, the open mode after lifter lowering is automatically set.

In this embodiment, as a load detecting means for detecting the magnitude of the load exerted on the lifting mechanism 530, a lifter motor over current detecting sensor 609 (FIG. 3) which is an ammeter for measuring a current value of the lifter motor M500. The lifter motor overcurrent detecting sensor 609 is connected to the accommodating portion controller 311. The CPU 301 acquires the value of the current, flowing through the lifter motor M500, measured by the lifter motor over current detecting sensor 609 through the accommodating portion controller 311.

FIG. 11 is a time-series chart showing a driving state of the lifter motor M500, the current value measured by the lifter motor overcurrent detecting sensor 609, discrimination of the overcurrent of the lifter motor M500, and accommodating portion open mode setting. When the lifter motor M500 is in the driven state, the current value starts to increase toward a set current value as a target value. At this time, as the mode setting of the accommodating portion open control, the normal open mode is set.

When the user supplies the large amount of the sheets at one time in this state, a relatively large load is exerted on the lifter motor M500 through the lifting mechanism 530. This load acts in a direction in which a rotational speed of the lifter motor M500 is made faster than a target value and therefore, the current value of the lifter motor M500 temporarily increases. The CPU 301 grasps this phenomenon that the current value of the lifter motor M500 temporarily increases and thus makes the overcurrent discrimination of the lifter motor M500. That is, when the current value of the lifter motor M500 exceeds a preset reference value (overcurrent limit), the CPU 301 discriminates that the overcurrent flowed through the lifter motor M500. Then, the CPU 301 automatically switches the mode setting of the accommodating portion open control to the open mode after lifter lowering (second mode) in place of the normal open mode (first mode), and then stores the mode switching in the RAM 303.

By this, in subsequent and later accommodating portion open control, the open mode after lifter lowering is executed, so that the accommodating portion unit 508 is opened in a state in which the lifter plate 507 is lowered to the lower-limit position of the accommodating portion main body 506. Accordingly, even when the user supplies the large amount of the sheets at one time, exertion of the large load on the lifting mechanism 530 is prevented, so that the durability of the option feeder 250 can be improved. On the other hand, in the case of users who do not use the sheets in a manner such that the large amount of the sheets are supplied at one time, the normal open mode is continued, and therefore, a state in which convenience during the sheet supply is high is maintained. Accordingly, also by this embodiment, compatibility between improvement in convenience during the sheet supply and improvement in durability can be realized.

Incidentally, as regards automatic switching timing of the accommodating portion open mode, hysteresis such that the number of times of cumulative detection of the overcurrent is stored in RAM 303 and the accommodating portion open mode is switched to the open mode after lifter lowering when this number of times of cumulative detection of the overcurrent exceeds a predetermined threshold may also be provided.

Further, in this embodiment, it is assumed that the overcurrent is detected during the lowering of the lifter plate 507, but after the lifter plate 507 is stopped at the supply position or the like, detection that a current which is a reference value or more flowed through the lifter motor M500 may also be made. That is, when the user supplies the large amount of the sheets at one time in the state in which the lifter plate 507 is at rest, it would be considered that the lifter motor M500 rotates although the CPU 301 provides no instruction. In this case, the lifter motor M500 function as a generator and utilizing that the current flows, the CPU 301 discriminates that a high load is exerted on the lifting mechanism 530 on the basis of the current value measured by the lifter motor overcurrent detecting sensor 609, and then sets the open mode after lifter lowering.

Further, a load detecting means for detecting that the overload was exerted on the constituent elements of the lifting mechanism 530, such as the supporting members 530*b* and the like is limited to a means for detecting the mode current. For example, the supporting member 531*b* is provided with a strain gauge, and then an output value of the strain gauge is compared with a reference value, so that whether or not the overload is exerted may also be discriminated.

Further, in this embodiment, description was made that the mode switching of the accommodating portion open control is automatically made when the overload is detected, but the mode switching may also be presented to the user through the display operation portion 310 when the overload is detected. Further, in the case where the mode switching of the accommodating portion open control is automatically made when the overload is detected, the mode switching may also be notified to the user through the display operation portion 310.

Summary of Embodiments

In the embodiments 1 and 2 and their modified embodiments which are described above, as the modes of the accommodating portion open control carried out when the accommodating portion open button 510 is pressed down, the two modes consisting of the normal open mode and the open mode after lifter lowering are prepared. In the operation in the normal open mode, irrespective of whether or not the lifter plate 507 is in the lower-limit position in the accommodating portion main body 506, a process in which the accommodating portion unit 508 is put in the open state by the accommodating portion open solenoid 610 is carried out (S21 to S23 of FIG. 8). On the other hand, in the operation in the open mode after lifter lowering, after the lifter plate 507 is lowered until the bottom position sensor 604 detects the lifter plate 507, a process in which the accommodating portion unit 508 is put in the open state by the accommodating portion open solenoid 610 is carried out (S34 to S36 of FIG. 9). In other words, the sheet feeding device includes a control means for controlling the open/close means and the lifting and lowering means by either one of the operations in the plurality of the modes including the first mode and the second mode. In the operation in the first mode, in the case where the CPU receives the open instruction from an open instruction means, the accommodating portion is is put in the open state by the open/close means irrespective of whether or not the lifter plate is in the lower-limit position. In the operation in the second mode, in the case where the CPU receives the open instruction from the open instruction means, after the lifter plate is lowered until the lower limit detecting means detects the lifter plate, the accommodating portion is put in the open state by the open/close means.

By this constitution, the mode is switched depending on the use method of the user, so that the compatibility between the convenience during the sheet supply and the durability can be realized. That is, in the case of users who do not desire that the users do not supply the sheet bundle in a large amount at one time, the sheet supply is made easy by setting the first mode. On the other hand, in the case of users who desire that the users supply the sheet bundle in the large amount at one time, by setting the second mode, the load when the sheets are stacked on the lifter plate is distributed to the accommodating portion, so that the durability of the device can be improved.

Incidentally, in the above-described embodiments, as an example of the sheet feeding device, the option feeder 250 connected to the side of the printer main assembly of the image forming apparatus was described as an example, but the present invention is also applicable to other sheet feeding devices. For example, a sheet feeding device incorporated into a lower portion of the printer main assembly.

Other Embodiments

The present invention is also capable of being realized in a process in which a program for realizing one or more functions in the above-described embodiments is supplied to a system or an apparatus through a network or a recording medium and in which one or more processor in a computer of the system and the apparatus reads and executes the program. Further, the present invention is also capable of being realized by a circuit (for example, ASIC) for realizing one or more function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-218302 filed on Dec. 2, 2019, which is hereby incorporated by reference herein in its entirety.

What is claimed is:

1. An image forming apparatus comprising:

an accommodating portion configured to accommodate a sheet;

an image forming portion configured to form an image on the sheet fed from the accommodating portion;

a lifter plate that is provided in the accommodating portion and on which the sheet is stacked;

a lifting and lowering mechanism configured to lift and lower the lifter plate;

a first sensor configured to detect that the lifter plate is in a lower-limit position in the accommodating portion;

a second sensor configured to detect the sheet stacked on the lifter plate at a predetermined position above the lower-limit position;

a supporter configured to support the lifter plate being at the lower-limit position, wherein the supporter is arranged not to support the lifter plate being at a position above the lower-limit position;

a locking portion including a latch member movable between (a) a locking position where the latch member locks the accommodating portion so as not to be drawn out and (b) a release position where the latch member permits the accommodating portion to be drawn out; and a control unit configured to execute an operation in one of a plurality of modes including a first mode and a second mode, when a predetermined instruction is received, wherein in the first mode, the control unit causes the lifting and lowering mechanism to lower the lifter plate until the second sensor does not detect the sheet, and causes the lifting and lowering mechanism to stop the lowering of the lifter plate if the first sensor detects that the lifter plate is in the lower-limit position before the second sensor does not detect the sheet, and controls the locking portion such that the latch member is allowed to move to the release position from the locking position after the predetermined instruction is received and before the first sensor detects that the lifter plate is in the lower-limit position, and wherein in the second mode, the control unit causes the lifting and lowering mechanism to lower the lifter plate until the first sensor detects that the lifter plate is in the lower-limit position irrespective of a detection result of the second sensor, and controls the locking portion such that (a) the latch member is kept in the locking position after the predetermined instruction is received before the first sensor detects that the lifter plate is in the lower-limit position and (b) the latch member moves to the release position from the locking position after the first sensor detects that the lifter plate is in the lower-limit position.

2. An image forming apparatus according to claim 1, wherein the lifter plate is hung by a wire, and wherein the lifting and lowering mechanism lifts and loads the lifter plate by winding up and feeding the wire by power supplied from a driving source.

3. An image forming apparatus according to claim 1, wherein in the operation in the first mode, the control unit opens the accommodating portion to the outside in parallel with lowering of the lifter plate to the predetermined position by the lifting and lowering mechanism.

4. An image forming apparatus according to claim 1, further comprising a button providing the predetermined instruction by pressing-down of the button by a user.

5. An image forming apparatus according to claim 1, further comprising an operating portion configured to be operated by an operator for changing setting of the mode, between the plurality of modes including the first mode and the second mode.

6. The image forming apparatus according to claim 1, wherein the supporter is a bottom portion of a main body of the accommodating portion.

7. An image forming apparatus comprising:

an accommodating portion configured to accommodate a sheet;

an image forming portion configured to form an image on the sheet fed from the accommodating portion;

a lifter plate that is provided in the accommodating portion and on which the sheet is stacked;

a lifting and lowering mechanism configured to lift and lower the lifter plate;

a first sensor configured to detect that the lifter plate is at a first predetermined position;

a second sensor configured to detect the sheet stacked on the lifter plate at a second predetermined position above the first predetermined position;

a supporter configured to support the lifter plate being at a lower-limit position, wherein the supporter is arranged not to support the lifter plate being at a position above the lower-limit position;

a locking portion including a latch member movable between (a) a locking position where the latch member locks the accommodating portion so as not to be drawn out and (b) a release position where the latch member permits the accommodating portion to be drawn out; and a control unit configured to execute an operation in one of a plurality of modes including a first mode and a second mode, when a predetermined instruction is received, wherein in the first mode, the control unit causes the lifting and lowering mechanism to lower the lifter plate until the second sensor does not detect the sheet, and causes the lifting and lowering mechanism to stop the lowering of the lifter plate if the first sensor detects that the lifter plate is at the first predetermined position before the second sensor does not detect the sheet, and controls the locking portion such that the latch member is allowed to move to the release position from the locking position after the predetermined instruction is received and before the first sensor detects that the lifter plate at the first predetermined position, and wherein in the second mode, the control unit causes the lifting and lowering mechanism to lower the lifter plate to the lower-limit position based on a detection result of the first sensor irrespective of a detection result of the second sensor, and controls the locking portion such that (a) the latch member is kept in the locking position after the predetermined instruction is received before the first sensor detects that the lifter plate is at the first predetermined position and (b) the latch member moves to the release position from the locking position after the first sensor detects that the lifter plate is at the first predetermined position.

* * * * *